US010733814B1

(12) United States Patent
Mullen et al.

(10) Patent No.: US 10,733,814 B1
(45) Date of Patent: *Aug. 4, 2020

(54) SYSTEM AND METHOD FOR USING A SPECIALTY VEHICLE DATA IDENTIFIER TO FACILITATE TREATMENT OF A VEHICLE DAMAGED IN A CRASH

(71) Applicant: STATE FARM MUTUAL AUTOMOBILE INSURANCE COMPANY, Bloomington, IL (US)

(72) Inventors: Christina P. Mullen, Waterford, VA (US); William J. Leise, Normal, IL (US); Douglas Albert Graff, Mountain View, CA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/337,809

(22) Filed: Oct. 28, 2016

Related U.S. Application Data

(63) Continuation of application No. 14/841,222, filed on Aug. 31, 2015, now Pat. No. 9,508,200, which is a continuation-in-part of application No. 14/635,043, filed on Mar. 2, 2015, now Pat. No. 9,466,085, which is a continuation of application No. 14/335,501, filed on Jul. 18, 2014, now Pat. No. 8,977,425, which is a continuation of application No. 14/085,487, filed on Nov. 20, 2013, now Pat. No. 8,972,100.

(60) Provisional application No. 61/798,949, filed on Mar. 15, 2013.

(51) Int. Cl.
*G07C 5/00* (2006.01)
*G07C 5/08* (2006.01)

(52) U.S. Cl.
CPC .......... *G07C 5/008* (2013.01); *G07C 5/0808* (2013.01)

(58) Field of Classification Search
CPC .......... G06F 13/00; G06F 13/14; G06F 17/00
See application file for complete search history.

(56) References Cited

U.S. PATENT DOCUMENTS

| | | |
|---|---|---|
| 3,810,313 A | 5/1974 | Hicks |
| 4,825,679 A | 5/1989 | Cortinovis |
| 5,128,859 A | 7/1992 | Carbone et al. |
| 5,317,503 A | 5/1994 | Inoue |
| 5,432,904 A | 7/1995 | Wong |
| 5,839,112 A | 11/1998 | Schreitmueller et al. |
| 5,950,169 A | 9/1999 | Borghesi et al. |
| 6,470,303 B2 | 10/2002 | Kidd et al. |
| 6,539,175 B1 | 3/2003 | Geary et al. |

(Continued)

FOREIGN PATENT DOCUMENTS

WO    WO-2005/043343 A2    5/2005

OTHER PUBLICATIONS

Allstate, "Auto Insurance Ballpark Estimate & Online Insurance Quote," (2014). Retrieved from the Internet: <URL:http://www.allstate.com/auto-insurance/quick-auto-insurance-quote.aspx>.

(Continued)

*Primary Examiner* — Anne Marie Antonucci
(74) *Attorney, Agent, or Firm* — Marshall, Gerstein & Borun LLP

(57) ABSTRACT

A system, method, and computer-readable medium to facilitate treatment of a damaged vehicle by gathering crash information, estimating an extent of vehicle damage, and transmitting information associated with treating the damaged vehicle.

13 Claims, 10 Drawing Sheets

(56) References Cited

U.S. PATENT DOCUMENTS

| | | | |
|---|---|---|---|
| 6,885,981 B2 | 4/2005 | Bomar, Jr. et al. |
| 7,324,951 B2 | 1/2008 | Renwick et al. |
| 7,502,772 B2 | 3/2009 | Kidd et al. |
| 7,596,512 B1 | 9/2009 | Raines et al. |
| 7,636,676 B1 | 12/2009 | Wolery et al. |
| 8,200,513 B2 | 6/2012 | Vahidi et al. |
| 8,265,963 B1 | 9/2012 | Hanson et al. |
| 8,311,856 B1 | 11/2012 | Hanson et al. |
| 8,364,505 B1 | 1/2013 | Kane et al. |
| 8,712,803 B1 | 4/2014 | Buentello |
| 8,755,779 B1 | 6/2014 | Burks et al. |
| 8,788,301 B1 | 7/2014 | Marlow et al. |
| 8,799,034 B1 | 8/2014 | Brandmaier et al. |
| 8,891,435 B2 | 11/2014 | Zhang et al. |
| 8,972,100 B2 | 3/2015 | Mullen et al. |
| 8,977,425 B1 | 3/2015 | Mullen et al. |
| 9,019,092 B1 | 4/2015 | Brandmaier et al. |
| 9,466,085 B2 | 10/2016 | Mullen et al. |
| 2002/0055861 A1 | 5/2002 | King et al. |
| 2002/0103622 A1 | 8/2002 | Burge |
| 2002/0188479 A1 | 12/2002 | Renwick et al. |
| 2003/0009270 A1 | 1/2003 | Breed |
| 2003/0111525 A1 | 6/2003 | Sweeney et al. |
| 2003/0233254 A1 | 12/2003 | Hamilton et al. |
| 2004/0044549 A1 | 3/2004 | Loop |
| 2004/0083041 A1 | 4/2004 | Skeen et al. |
| 2004/0117081 A1 | 6/2004 | Mori |
| 2004/0148188 A1 | 7/2004 | Uegaki |
| 2004/0153356 A1 | 8/2004 | Lockwood et al. |
| 2004/0233077 A1 | 11/2004 | Mizusawa |
| 2005/0075767 A1 | 4/2005 | Dasti et al. |
| 2005/0108065 A1 | 5/2005 | Dorfstatter |
| 2005/0125261 A1 | 6/2005 | Adegan |
| 2006/0195384 A1 | 8/2006 | Bauer et al. |
| 2008/0046261 A1 | 2/2008 | Cunningham |
| 2008/0183600 A1 | 7/2008 | Bowser et al. |
| 2008/0243556 A1 | 10/2008 | Hogan et al. |
| 2008/0255887 A1 | 10/2008 | Gruter |
| 2008/0306996 A1 | 12/2008 | McClellan et al. |
| 2009/0018859 A1 | 1/2009 | Purifoy et al. |
| 2009/0043601 A1 | 2/2009 | Schuh et al. |
| 2009/0062978 A1 | 3/2009 | Picard |
| 2009/0300065 A1 | 12/2009 | Birchall |
| 2010/0138242 A1 | 6/2010 | Ferrick et al. |
| 2010/0198637 A1 | 8/2010 | Jenkins et al. |
| 2011/0010276 A1 | 1/2011 | Bowser et al. |
| 2011/0058048 A1 | 3/2011 | Elazar et al. |
| 2011/0087505 A1 | 4/2011 | Terlep |
| 2011/0313936 A1 | 12/2011 | Sieger |
| 2011/0313951 A1 | 12/2011 | Cook |
| 2012/0083959 A1 | 4/2012 | Dolgov et al. |
| 2012/0136802 A1 | 5/2012 | McQuade et al. |
| 2012/0265563 A1 | 10/2012 | Kwasny |
| 2012/0297337 A1 | 11/2012 | St. Denis et al. |
| 2013/0218761 A1 | 8/2013 | Kwasny |
| 2014/0081876 A1 | 3/2014 | Schulz |
| 2014/0229207 A1 | 8/2014 | Swamy et al. |
| 2014/0278571 A1 | 9/2014 | Mullen et al. |
| 2014/0278572 A1 | 9/2014 | Mullen et al. |
| 2014/0279169 A1 | 9/2014 | Leos |
| 2015/0019447 A1 | 1/2015 | Baughman et al. |
| 2015/0066781 A1 | 3/2015 | Johnson et al. |
| 2015/0178852 A1 | 6/2015 | Mullen et al. |

OTHER PUBLICATIONS

Glennon, Automobile crash event data recorder downloading, CrashForensics.com, archived Aug. 10, 2009, available at: http://www.crashforensics.com/automobiledatarecorders.cfm (accessed Dec. 12, 2015).

Glennon, Crash investigation and reconstruction references, CrashForensics.com, archived Oct. 27, 2010, available at http://www.crashforensics.com/papers.cfm?PaperID=20 (accessed Dec. 12, 2015).

Google.com, search results for the string "Auto Repair Quote" (2014).

LKQonline.com webpage, available at <http://www.lkqonline.com/custom/content/recycledautoparts.htm> (visited on Feb. 19, 2014; archived on Sep. 1, 2009.

State Farm, "Insurance Rate Quote," (2014). Retrieved from the Internet: <URL:https://www.statefarm.com/insurance/quotes>.

U.S. Appl. No. 14/085,487, Corrected Notice of Allowability, dated Dec. 15, 2014.

U.S. Appl. No. 14/085,487, Corrected Notice of Allowability, dated Jan. 30, 2015.

U.S. Appl. No. 14/085,487, Corrected Notice of Allowability, dated Oct. 31, 2014.

U.S. Appl. No. 14/085,487, Nonfinal Office Action, dated Feb. 12, 2014.

U.S. Appl. No. 14/085,487, Notice of Allowance, dated Jun. 17, 2014.

U.S. Appl. No. 14/085,497, Final Office Action, dated Apr. 19, 2016.

U.S. Appl. No. 14/085,497, Final Office Action, dated Dec. 24, 2014.

U.S. Appl. No. 14/085,497, Final Office Action, dated Jul. 16, 2015.

U.S. Appl. No. 14/085,497, Nonfinal Office Action, dated Dec. 22, 2015.

U.S. Appl. No. 14/085,497, Nonfinal Office Action, dated Apr. 8, 2015.

U.S. Appl. No. 14/085,497, Nonfinal Office Action, dated Feb. 27, 2014.

U.S. Appl. No. 14/085,497, Nonfinal Office Action, dated Sep. 10, 2014.

U.S. Appl. No. 14/085,497, Nonfinal Office Action, Oct. 17, 2016.

U.S. Appl. No. 14/085,512, Final Office Action, dated Apr. 21, 2016.

U.S. Appl. No. 14/085,512, Final Office Action, dated Jul. 16, 2015.

U.S. Appl. No. 14/085,512, Final Office Action, dated Nov. 28, 2014.

U.S. Appl. No. 14/085,512, Final Office Action, dated Oct. 20, 2016.

U.S. Appl. No. 14/085,512, Nonfinal Office Action, dated Feb. 28, 2014.

U.S. Appl. No. 14/085,512, Nonfinal Office Action, dated Jul. 18, 2014.

U.S. Appl. No. 14/085,512, Nonfinal Office Action, dated Mar. 25, 2015.

U.S. Appl. No. 14/085,512, Nonfinal Office Action, dated Dec. 21, 2015.

U.S. Appl. No. 14/335,501, Notice of Allowance, dated Jan. 2, 2015.

U.S. Appl. No. 14/335,501, Notice of Allowance, dated Jan. 28, 2015.

U.S. Appl. No. 14/335,501, Notice of Allowance, dated Nov. 21, 2014.

U.S. Appl. No. 14/335,501, Notice of Allowance, dated Sep. 11, 2014.

U.S. Appl. No. 14/635,043, Final Office Action, dated Sep. 1, 2015.

U.S. Appl. No. 14/635,043, Nonfinal Office Action, dated Apr. 7, 2015.

U.S. Appl. No. 14/635,043, Notice of Allowance, dated Jun. 29, 2016.

U.S. Appl. No. 14/635,043, Notice of Allowance, dated Nov. 25, 2015.

U.S. Appl. No. 14/635,043, Notice of Allowance, dated Mar. 3, 2016.

U.S. Appl. No. 14/841,179, Final Office Action, dated Sep. 2, 2016.

U.S. Appl. No. 14/841,179, Nonfinal Office Action, dated Apr. 27, 2016.

U.S. Appl. No. 14/841,200, Final Office Action, dated Sep. 6, 2016.

U.S. Appl. No. 14/841,200, Nonfinal Office Action, dated Apr. 27, 2016.

U.S. Appl. No. 14/841,222, Notice of Allowance, dated Jul. 28, 2016.

U.S. Appl. No. 14/841,222, Final Office Action, dated Apr. 6, 2016.

U.S. Appl. No. 14/841,222, Nonfinal Office Action, dated Apr. 6, 2016.

U.S. Appl. No. 14/841,222, Nonfinal Office Action, dated Nov. 2, 2015.

U.S. Appl. No. 15/010,895, Final Office Action, dated Aug. 5, 2016.

(56) References Cited

OTHER PUBLICATIONS

U.S. Appl. No. 15/010,895, Nonfinal Office Action, dated Mar. 23, 2016.
U.S. Appl. No. 14/841,200, Non-Final Office Action, dated Dec. 29, 2016.
U.S. Appl. No. 14/841,179, Non-Final Office Action, dated Dec. 30, 2016.
U.S. Appl. No. 14/841,179, Final Office Action, dated May 3, 2017.
U.S. Appl. No. 14/841,200, Final Office Action, dated May 4, 2017.
U.S. Appl. No. 14/085,497, Final Office Action, dated Oct. 16, 2017.
U.S. Appl. No. 14/085,512, Non-Final Office Action, dated Nov. 13, 2017.
U.S. Appl. No. 14/085,497, Non-Final Office Action, dated Apr. 2, 2018.
U.S. Appl. No. 15/417,878, Non-Final Office Action, dated Apr. 4, 2018.
U.S. Appl. No. 14/085,512, Final Office Action, dated Apr. 20, 2018.
U.S. Appl. No. 14/085,497, Final Office Action, dated Sep. 21, 2018.
U.S. Appl. No. 15/417,878, Final Office Action, dated Sep. 27, 2018.
U.S. Appl. No. 14/841,200, Non-Final Office Action, dated Aug. 22, 2017.
U.S. Appl. No. 14/085,512, Final Office Action, dated Jul. 24, 2017.
U.S. Appl. No. 14/085,512, Non-Final Office Action, dated Mar. 13, 2017.
U.S. Appl. No. 15/417,878, Final Office Action, dated Oct. 19, 2017.

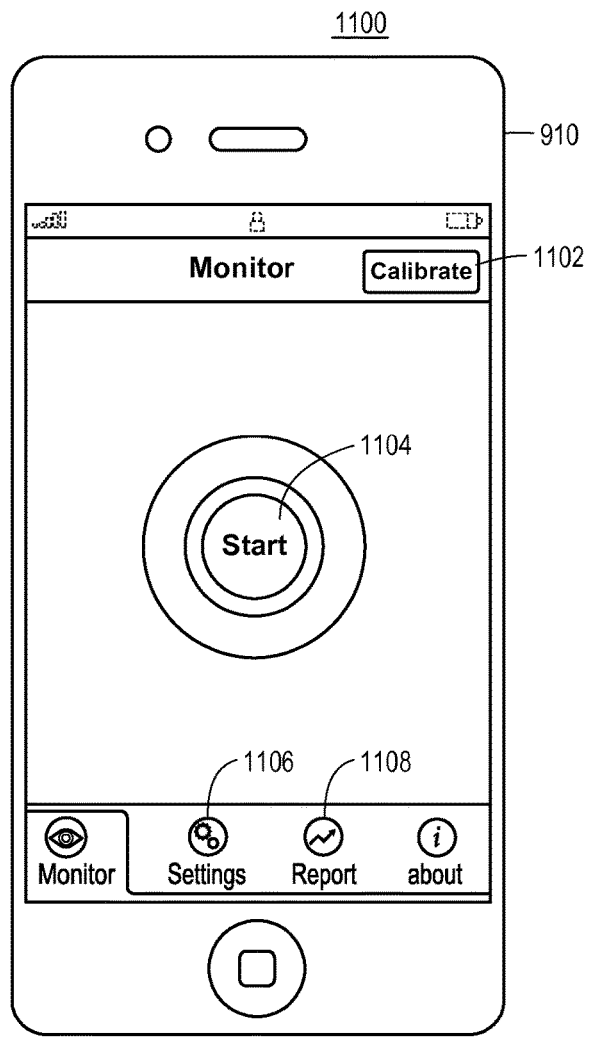 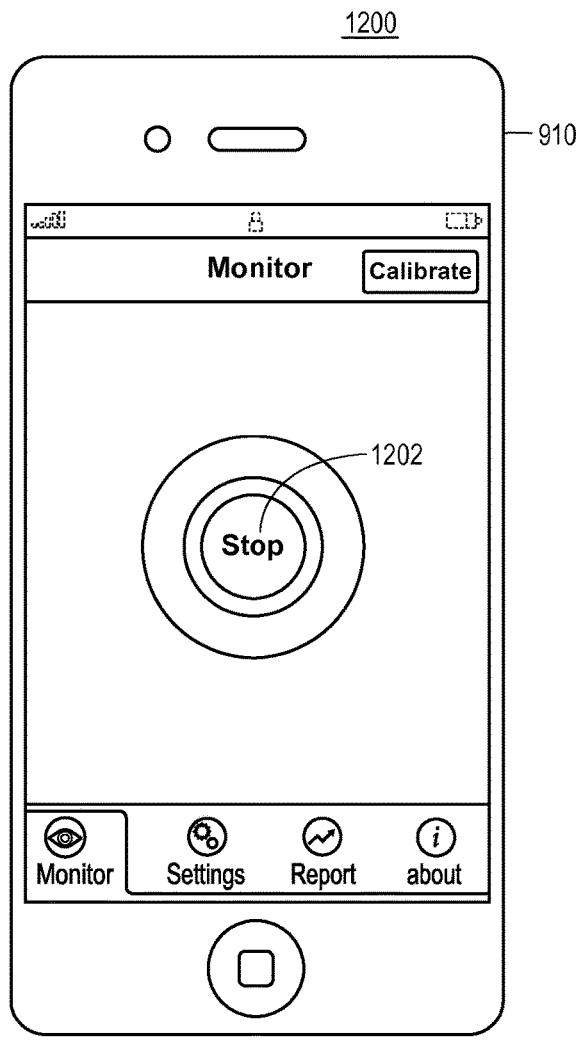
*FIG. 11*     *FIG. 12*

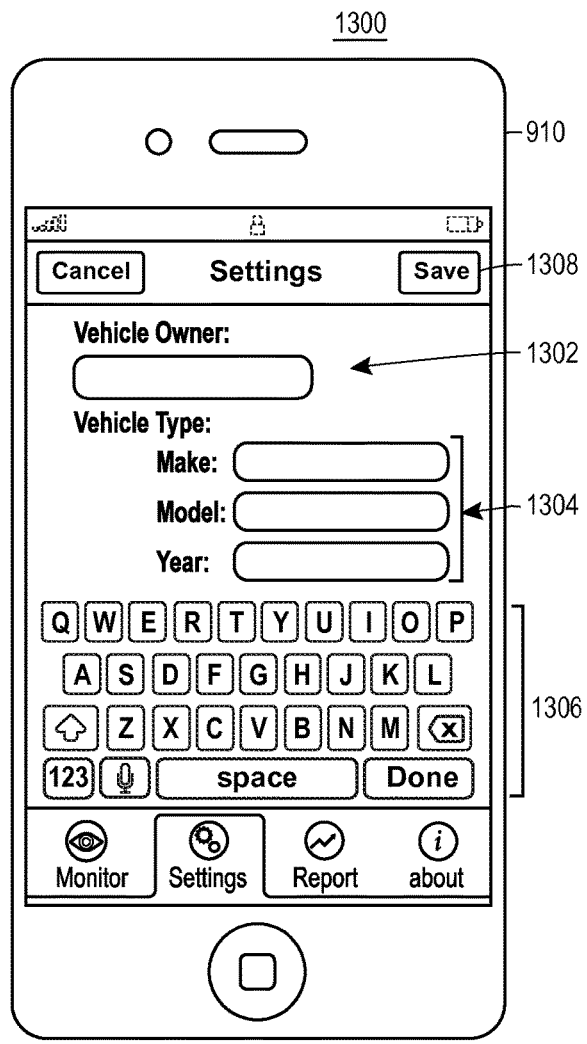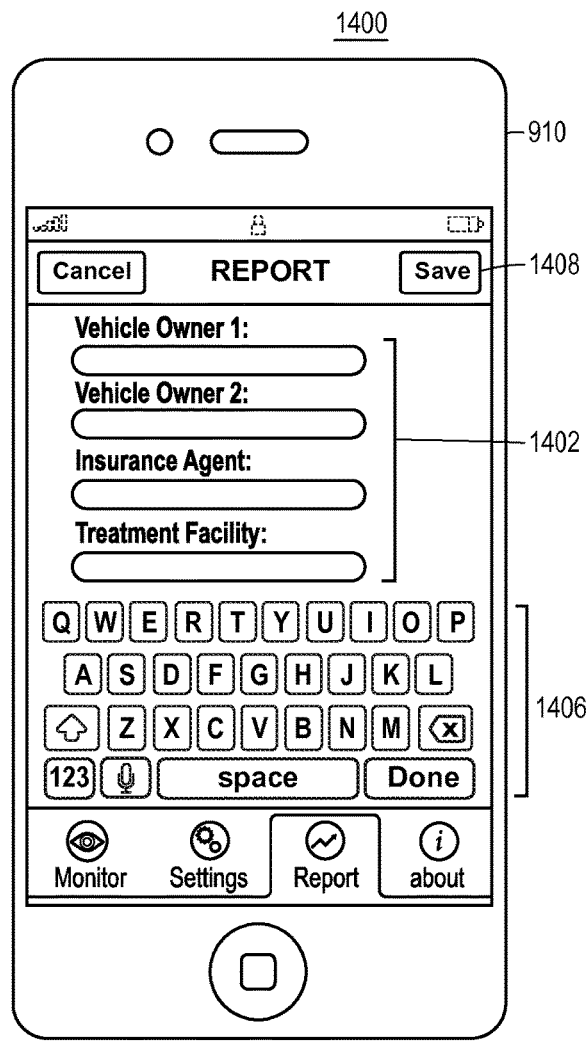
FIG. 13
FIG. 14

SYSTEM AND METHOD FOR USING A SPECIALTY VEHICLE DATA IDENTIFIER TO FACILITATE TREATMENT OF A VEHICLE DAMAGED IN A CRASH

RELATED APPLICATIONS

This application is a continuation of U.S. patent application Ser. No. 14/841,222, filed Aug. 31, 2015, which is a continuation-in-part application of U.S. patent application Ser. No. 14/635,043, filed Mar. 2, 2015 (now U.S. Pat. No. 9,466,085); which is a continuation application of U.S. patent application Ser. No. 14/335,501, filed Jul. 18, 2014 (now U.S. Pat. No. 8,977,425); which is a continuation application of U.S. patent application Ser. No. 14/085,487, filed Nov. 20, 2013 (now U.S. Pat. No. 8,972,100); which claims benefit to the filing date of U.S. Provisional Patent Application 61/798,949, filed Mar. 15, 2013; and the contents of each of these applications are expressly incorporated herein by reference. This application is also related to pending U.S. patent application Ser. No. 14/085,497, filed Nov. 20, 2013; Ser. No. 14/085,512, filed Nov. 20, 2013; Ser. No. 14/841,200, filed Mar. 31, 2015; Ser. No. 14/841,179, filed Mar. 31, 2015; and Ser. No. 15/010,895, filed Jan. 29, 2016; and the contents of each of these related patent applications are expressly incorporated herein by reference.

TECHNICAL FIELD

The present disclosure generally relates to a system and a method for treating a vehicle damaged in a crash. In general, the system and/or method utilizes a specialty vehicle data identifier to estimate an amount of damage to the vehicle, wherein information associated with treating the damaged vehicle may then be transmitted to facilitate treatment of the damaged vehicle. The treatment information may include or be associated with repairing, salvaging, and/or transporting the damaged vehicle to an appropriate treatment facility.

BACKGROUND

Every year, vehicles are involved in accidents, e.g., collisions, which result in varying amounts of damage to the vehicle. If the damaged vehicle is insured, an insurance claim is usually filed shortly after the collision. The damaged caused to the vehicle may be estimated in a variety of ways, including using images, video, or a combination thereof, and/or the damaged vehicle may be brought to a location for an appraisal or assessment of the damage. Depending on the extent of the damage and the treatment facility where the damaged vehicle was brought, the damaged vehicle may then need to be further transported to a different treatment facility that is capable of performing the necessary repairs; or in the case where the vehicle damage is too costly to repair, to a salvage or a scrap facility. Additional steps and costs may be incurred when the damaged vehicle is brought to a first location for an initial appraisal and then to a subsequent location for the repair, salvage, or scrap treatment. By determining the extent of vehicle damage and the corresponding treatment shortly after a collision, the steps, costs, and time involved to customarily process an insurance claim may be reduced by estimating the extent of vehicle damage shortly after the collision and then transporting the damaged vehicle from the collision location to an appropriate vehicle treatment facility.

SUMMARY

Example systems and methods for treating and/or routing a damaged vehicle after a crash are herein described. In accordance with a first example aspect of the invention, a method implemented on a computer system for treating a vehicle damaged in a crash includes receiving crash information about a damaged vehicle, and receiving at least one segment of a plurality of segments of a specialty vehicle data identifier used to identify the damaged vehicle, wherein the at least one segment of the specialty vehicle data identifier is representative of a vehicle attribute of the damaged vehicle. The method further includes requesting vehicle collision data stored on a memory, e.g., database, wherein the vehicle collision data is associated with the received at least one segment of the plurality of segments of the specialty vehicle data identifier. The method further includes receiving the vehicle collision data from the memory in response to the request, analyzing the received crash information, and determining a treatment complexity level associated with treating the damaged vehicle based on the analysis of the received crash information, wherein treating the damaged vehicle includes repairing, salvaging, and/or scrapping the damaged vehicle. The system further includes selecting a treatment facility for treating the damaged vehicle based on the determined treatment complexity level, and transmitting information associated with treating the damaged vehicle to the selected treatment facility.

In accordance with a second example aspect of the invention, a computer system for treating and/or routing a vehicle damaged in a crash includes one or more processors configured to receive crash information of the damaged vehicle. The crash information includes at least one segment of a specialty vehicle data identifier used to identify the damaged vehicle, wherein the at least one segment of the specialty vehicle data identifier is representative of a vehicle attribute of the damaged vehicle. The system further includes a user interface module coupled to the one or more processors and facilitating interaction between the system and a user; one or more memory devices coupled to the one or more processors and including vehicle collision data stored thereon. The vehicle collision data is associated with at least one segment of a plurality of segments of a specialty vehicle data identifier template used to facilitate translation of the specialty vehicle data identifier. The system further includes executable instructions stored on the one or more memory devices, which when executed by the one or more processors cause the computer system to analyze the received crash information and determine an output including a treatment complexity level for treating the damaged vehicle, wherein treating the damaged vehicle includes repairing, salvaging, and/or scrapping the damaged vehicle. The system further includes an output module operatively coupled to the one or more processors and providing the output in an accessible format, and a communication module is operatively coupled to the one or more processors and configured to transmit information associated with the output.

In accordance with a third example aspect of the invention directed to a computer system for treating a vehicle damaged in a crash, the computer system includes one or more processors coupled to one or more memory devices and one or more user interfaces. The one or more processors are configured to receive crash information of the damaged vehicle, wherein the crash information includes a specialty vehicle data identifier used to identify the damaged vehicle, and wherein the specialty vehicle data identifier includes a plurality of segments and at least one segment of the plurality of segments is representative of a vehicle attribute of the damaged vehicle. The system is configured to automatically: receive crash information about the damaged vehicle; receive at least one segment of a plurality of segments of a specialty vehicle data identifier; request vehicle collision data from a memory, e.g., database, the vehicle collision data associated with one or more segments of a specialty vehicle data identifier template used to facilitate translation of the specialty vehicle data identifier; and receive the vehicle collision information from the memory in response to the request. The system is further configured to analyze the received crash information; determine a treatment complexity level associated with treating the damaged vehicle based on the analysis of the received crash information; select a treatment facility for treating the damaged vehicle based on the determined treatment complexity level; and transmit information associated with treating the damaged vehicle to the selected treatment facility, wherein treating the damaged vehicle includes repairing, salvaging, and/or scrapping the damaged vehicle.

In accordance with a fourth example aspect of the invention, a tangible non-transitory computer-readable medium stores instructions, which when executed by a processor of a computer system, cause the computer system to receive crash information about a damaged vehicle; receive at least one segment of a plurality of segments of a specialty vehicle data identifier used to identify the damaged vehicle, wherein the at least one segment is representative of a vehicle attribute; and request vehicle collision data from a memory, e.g., database, wherein the vehicle collision data is associated with one or more segments of a specialty vehicle data identifier template used to facilitate translation of the specialty vehicle data identifier. The executed instructions further cause the computer system to receive the vehicle collision data from the memory in response to the request; analyze the received crash information; determine a treatment complexity level associated with treating the damaged vehicle based on the analysis of the received crash information; select a treatment facility for treating the damaged vehicle based on the determined treatment complexity level; and transmit information associated with treating the damaged vehicle to the selected treatment facility, wherein treating the damaged vehicle includes repairing, salvaging, and/or scrapping the damaged vehicle.

These aspects and embodiments address known gaps within the technical field of treating damaged vehicles, such as the logistical delays and costs associated with repairing, salvaging, and/or scrapping a damaged vehicle. In particular, the technology described herein utilizes a memory structure that facilitates the flow and transformation of data used in calculating a vehicle treatment for a damaged vehicle and determining a vehicle treatment facility for providing the requisite vehicle treatment. For example, a specialty vehicle data identifier facilitates convenient access to a vast amount of vehicle data related to a specific vehicle and/or a general vehicle-type, such as historical collision data, vehicle build data, vehicle repair history, vehicle owner data, policyholder data, etc. The specialty vehicle data identifier is utilized to determine a more accurate vehicle treatment for treating the damaged vehicle. Based on the determined vehicle treatment, the system identifies a vehicle treatment facility capable of treating the damaged vehicle and sends information related to treating the damaged vehicle, thereby removing the need to dispatch a vehicle damage assessor to the crash location or transport the damaged vehicle to an interim location for assessing the vehicle damage, thereby allowing for the damaged vehicle to be transported directly from the crash location to an appropriate vehicle treatment facility for treatment.

BRIEF DESCRIPTION OF THE DRAWINGS

The figures described below depict various aspects of the systems and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures may be designated with consistent reference numerals.

FIGS. 11-14 depict example embodiments of displayed information on the user interface of the computing device(s) in accordance with the embodiments described herein.

DETAILED DESCRIPTION

Figure 1A:
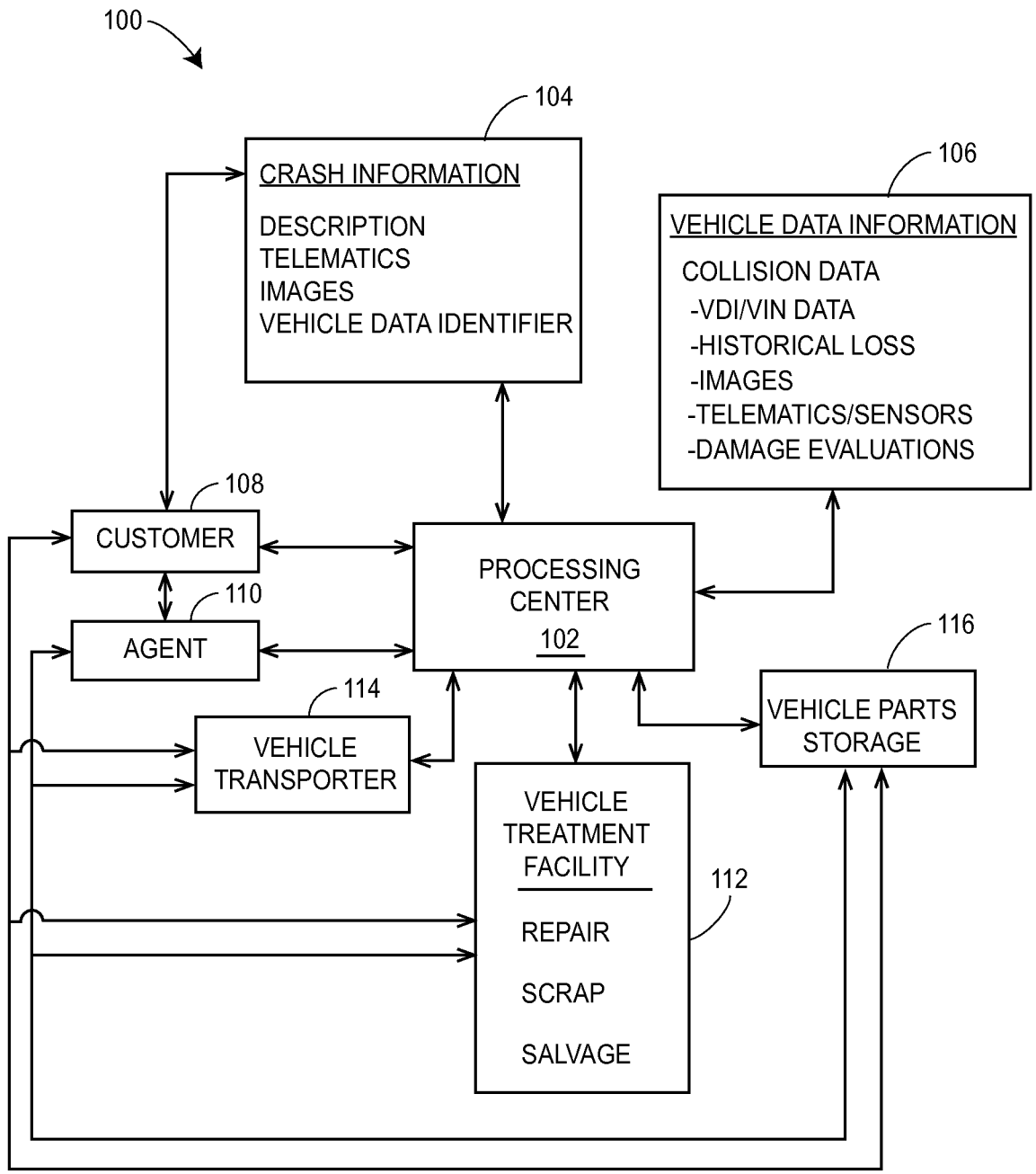
FIG. 1A is a general overview of a vehicle treatment system for treating a vehicle damaged in a crash.

A vehicle treatment system utilizes vehicle crash data of a vehicle involved in a crash to approximate the extent of damage to the vehicle and determine a treatment facility for treating the damaged vehicle. Based on the estimated vehicle damage, the system calculates a treatment complexity level for treating the damaged vehicle and then identifies one or more treatment facilities capable of treating the damaged vehicle. The system may send information relating to the vehicle treatment to one or more entities and/or individuals associated with the damaged vehicle. For example, information may be sent to a vehicle transporter for transporting the damaged vehicle from the crash site to a selected treatment facility, thereby removing the need to initially bring the damaged vehicle to an interim location for a damage assessment before transporting the damaged vehicle to a designated treatment facility for treatment. In addition, the transmitted information may include calculated vehicle repairs and/or vehicle parts determined for the treatment of the damaged vehicle.

More specifically, the vehicle treatment system receives vehicle crash information, which may be in the form of, at least, visual, verbal, and/or electronic descriptions, that may include: crash acceleration, crash velocity, crash impact direction, crash damage, vehicle safety response, and/or operability of the damaged vehicle. To estimate the extent of vehicle damage caused in the crash, the system may analyze the descriptions of the damaged vehicle. Example descriptions of the damaged vehicle include, and are not limited to: appearance and/or images of the damaged vehicle, operating capability of the damaged vehicle, and vehicle crash data attained in real time by sensors and/or telematics devices coupled to the damaged vehicle. In one example embodiment, the analysis of the crash information includes a comparison of vehicle crash information, which was obtained in real time during operation of the vehicle, to collision data of a vehicle type (e.g., make, model, and/or trim level) that includes or corresponds to the vehicle type of the damaged vehicle. The collision data may include various levels of vehicle damage associated with specified aspects of collision data. For example, one category of vehicle damage in the collision data may be equated to images, descriptions, and/or vehicle operating characteristics of the vehicle proximate the time of the crash, e.g., vehicle acceleration, vehicle velocity, vehicle direction, and/or impact area on the damaged vehicle.

Based on the calculated extent of vehicle damage estimated by the analysis/analyses of the crash information, the system determines an appropriate vehicle treatment complexity level for treating the damaged vehicle. Thereafter, information related to treating the damaged vehicle is then transmitted by the system. For example, the vehicle treatment information may be automatically sent to one or more treatment facilities capable of performing the requisite vehicle treatment. The transmitted information may include a request for a proposal to treat the damaged vehicle, wherein a quote in response to the request for proposal to perform the vehicle treatment may be received by the system from one or more vehicle treatment facilities. The vehicle treatment information may also be sent to an individual or entity such as the vehicle owner, associated vehicle insurance agent, or a vehicle transporter. For example, the system provides for vehicle treatment information to be sent to a vehicle transporter, wherein the vehicle transporter may transport the damaged vehicle from the crash site directly to a treatment facility capable of performing the appropriate vehicle treatment, e.g., repair, salvage, and/or scrap; shortly after the crash. By providing such capability, the system avoids the cost and delay associated with transporting the damaged vehicle to a vehicle damage assessment center or having an adjuster visit the damaged vehicle to assess an insurance claim before the damaged vehicle is transported to a designated treatment facility for treatment.

FIG. 1A is a general overview of a system 100 for determining a treatment for a vehicle damaged in a crash. As used herein, the term "vehicle" refers to any type of transport that may be powered or unpowered (e.g., transported or towed by another vehicle) and is commonly used to move people and/or cargo that range in size from a single occupant and/or freight to multiple occupant passengers and/or freight. These vehicles also include a wide range of types, including motorcycles, automobiles, busses, trucks, trains, bicycles, aircraft, and watercraft. While the vehicle may normally be controlled by an operator, it is to be understood that the vehicle may be unmanned and remotely or autonomously operated in another fashion, such as using controls other than the steering wheel, gear shift, brake pedal, and accelerator pedal.

The system 100 in FIG. 1A includes a processing center 102 capable of facilitating an analysis of the damaged vehicle's crash information 104. The analysis of the crash information 104 may be performed by system personnel and/or a computing device or system at the processing center 102. The analysis may include evaluating vehicle operating characteristics at or near the time of the crash and evaluating crash information. Additionally, the analysis of the crash information may include a comparison of the damaged vehicle crash information 104 with comparable vehicle information, e.g., collision data, stored within a memory device or database 106, wherein an estimate of the extent of vehicle damage and related vehicle treatment for the damaged vehicle may be determined. Throughout this description, the term crash and/or crash information is generally used in reference to the particular incident in which a particular vehicle was damaged and the term collision and/or collision data and/or collision information is generally used in reference to one or more events in which one or more vehicles, other than the vehicle damaged in the crash, were damaged.

The crash information 104 provided to the processing center 102 includes specific information related to the crash that damaged the vehicle, which may include information received from the vehicle owner 108, vehicle driver or vehicle occupant, an insurance agent 110 and/or entity related to the damaged vehicle, an emergency responder, a bystander, or a crash investigator. Some aspects or characteristics of the crash may be automatically relayed to system personnel and/or the processing center 102 by vehicle sensors and/or telematics devices operatively coupled to the vehicle. The vehicle sensors and telematics devices enable a computing device positioned within the vehicle and/or the processing center 102 to automatically attain crash characteristics including vehicle operating information proximate the time of impact, e.g., vehicle acceleration, velocity, and/or direction of impact. The crash characteristics of the damaged vehicle may also be provided to system personnel and/or the processing center 102 by an observer of the crash. For example, the driver and/or vehicle sensor(s) of the damaged vehicle may provide crash information such as the approximate speed of the vehicle at the time of the crash and what part, section, or area of the vehicle was damaged. Other crash information provided to system personnel and/or the processing center 102 may include whether safety equipment, e.g., airbags, was deployed and/or if the vehicle is drivable. Images of the damaged vehicle may be provided to system personnel and/or the processing center 102. Any of the crash characteristics may later be used for analysis and/or comparison to other known collision information of similarly damaged vehicles of the same or similar type (e.g., make, model, and/or trim level) as the damaged vehicle.

Figure 1B:
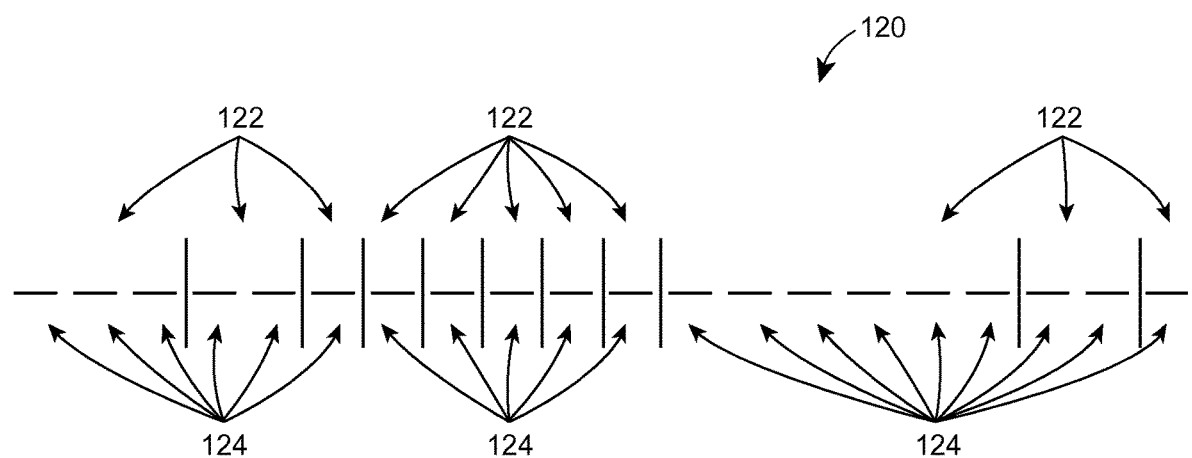
FIG. 1B depicts an example specialty vehicle data identifier template for a specialty vehicle data identifier (VDI) used to identify a vehicle in accordance with the embodiments described herein.

Additional crash information may include a specialty vehicle data identifier (VDI) associated with the damaged vehicle. The specialty vehicle data identifier may have been made available to and retained by system personnel and/or the processing center 102 prior to the crash. The specialty vehicle data identifier is a coded descriptor for identifying a vehicle and may be configured to include one or more segments of coded representations of vehicle attributes associated with any desired type or category of information that the user may find useful in providing vehicle insurance services, e.g., determining vehicle damage caused by a crash. For example, a specialty vehicle data identifier template 120 shown in FIG. 1B includes a plurality of segments 122 wherein each segment of the plurality of segments includes one or more alpha-numeric and/or non-alphanumeric characters 124 to represent the one or more vehicle attributes.

The alphanumeric and non-alphanumeric characters 124 may be a consistent representation of a vehicle attribute within a particular segment 122 of the specialty vehicle data identifier 120. Alternatively, the alphanumeric and non-alphanumeric characters may be a variable representation of a vehicle attribute within a particular segment 122. In other words, a particular single or set of alphanumeric and/or non-alphanumeric characters in a particular segment 122 may be representative of vehicle information for a particular vehicle manufacturer or a particular vehicle type or may pertain to a particular year of manufacture; while for a different vehicle manufacturer or a different vehicle type or a different year of manufacture, the same particular single or set of alphanumeric and/or non-alphanumeric characters in the same particular segment 122 of another specialty vehicle data identifier may be representative of different vehicle information. For example, two specialty vehicle data identifiers may each include "H\z6P" representing a vehicle attribute within the segment of a respective specialty vehicle data identifier. However, if each of the two specialty vehicle identifiers in this example is associated with a different vehicle manufacturer, the coded representation within a particular segment of the specialty vehicle data identifier, e.g., "H\z6P," may pertain to one engine type for one manufacturer's specialty vehicle data identifier, while the same coded representation within the respective particular segment of the other specialty vehicle data identifier, e.g., "H\z6P," may pertain to different engine type for the other vehicle manufacturer. Additionally, the same vehicle attribute may be represented by a different one or set of alphanumeric and/or non-alphanumeric characters. For example, "K\#w8" within a particular segment of the specialty vehicle data identifier may pertain to a body type associated with one vehicle manufacturer, while "56_@z" within the respective particular segment of the other specialty vehicle data identifier may pertain to the same body type associated with different vehicle manufacturer.

A fully populated specialty vehicle data identifier may correspond to a unique vehicle and a partially populated specialty vehicle data identifier may be representative of a group of vehicles having at least one vehicle attribute in common. In other words, a specialty vehicle data identifier may be considered discrete even though the specialty vehicle data identifier may or may not correspond to a single physical vehicle, but rather pertain to a symbolic vehicle or a group of vehicles with a common vehicle attribute. That is, if any one of the plurality of segments of a specialty vehicle data identifier lack vehicle attribute information (e.g., serial number), the specialty vehicle data identifier is considered incomplete and not fully populated. Although an incomplete specialty vehicle data identifier may not correspond with or be representative of a particular vehicle, it may be representative of a group, type, or class of vehicle (e.g., vehicle make, vehicle model, and/or vehicle trim level).

Information associated with any of the vehicle attributes configured within the specialty vehicle data identifier template 120 and/or specialty vehicle data identifier may be stored in the vehicle data information memory 106 and categorized with one or more segments 122 of the specialty vehicle data identifier template 120 and/or specialty vehicle data identifier. For example, a look-up table may be utilized to equate segments within the specialty vehicle data identifier template 120 and/or coded segments 122 of the specialty vehicle data identifier with the information stored within the vehicle data information memory 106. The content of the characters 124 within each populated segment 122 of the specialty vehicle data identifier corresponds to, or is representative of, one or more vehicle attributes and/or vehicle information that is specifically and/or generally related to the vehicle. For example, a segment 122 of the specialty vehicle data identifier template 120 and/or specialty vehicle data identifier may involve specific information and include any type of information associated with a unique individual vehicle; and/or may involve general information and include any type of information associated with a group, type, or classification of vehicle. In particular, a specific vehicle attribute may include and/or be associated with vehicle owner information, a collision history for a particular vehicle, and/or an exclusive serial number for the vehicle. A general vehicle attribute may include and/or be associated with general collision history (e.g., statistics) related to a group, type, or classification of vehicle, for example, a vehicle make, model, and/or trim level. While specific information may typically be associated with one particular vehicle, e.g., vehicle owner information, serial number; the categorization of specific and general information may overlap and need not be exclusively associated with a unique vehicle or a group of vehicles.

Example vehicle attributes that may be represented, e.g., by a code, within or by one or more segments of the specialty vehicle data identifier and/or specialty vehicle data identifier template include specific data related to a particular vehicle and/or general data related to the vehicle type (e.g., make, model, and/or trim level) including, and not limited to: vehicle owner information; vehicle insurer data; vehicle collision history of a particular vehicle type; vehicle manufacturer information (e.g., year built and location built); vehicle body style; vehicle engine type; vehicle safety equipment; vehicle and/or vehicle equipment recall alerts; vehicle defect investigations, notices, reports, and complaints; vehicle service bulletins; recommended vehicle repair procedures and costs; warranties, costs, and market value estimations related to vehicle type(s) and/or vehicle part(s); government regulations related to vehicles; vehicle maintenance records; vehicle operating data (e.g., event data recorder data, vehicle telematics device data and/or sensor data); vehicle marketing data; vehicle actuarial data; vehicle consumer data; vehicle insurance rating data; vehicle underwriting data; and vehicle insurance claims data; vehicle occupant injury history of a vehicle type; litigation history of a vehicle type; original equipment manufacturer (OEM) data of a vehicle type; OEM recall and/or product liability data of a vehicle type; technical service bulletins of a vehicle type; semi-autonomous system claims handling of a vehicle type; weather conditions associated with a loss related to a vehicle type; treatment (e.g., repair and/or salvage) routing of a vehicle type; rental subrogation of a vehicle type; sales/leases of a particular vehicle type; maintenance records and/or history of a particular vehicle type; vehicle registrations of a particular vehicle; vehicle serial numbers; vehicle owner information, vehicle photos, vehicle testing results, vehicle research study results.

Another vehicle attribute that may be included within or associated with one or more segments of the specialty vehicle data identifier and/or specialty vehicle data identifier template 120 is a vehicle identification number (VIN) and/or VIN data. The VIN is used in the automotive industry to identify vehicles (e.g., motor vehicles, towed vehicles, motorcycles, scooters, and mopeds) as defined in International Organization for Standardization (ISO) 3833, which has been adopted by many countries including the European Union and the United States of America. The VIN includes a segment for a vehicle serial number, which when fully populated and decoded, is exclusively associated with a unique vehicle.

Additional vehicle data referenced or represented within the specialty VDI may include vehicle manufacturer information such as recommended repair procedures and costs; vehicle part warranties, costs, and market value estimations of various vehicles and vehicle parts; etc. Further segments within the specialty VDI may also refer to or represent historical vehicle loss information, which may include recorded amounts of vehicle damage associated with or resulting from known, observed, or measured aspects of a vehicle collision, impact, or loss; for example, vehicle acceleration, velocity, and/or direction at the time of a crash. Additional examples of historical vehicle loss data include: vehicle crash test results, bumper test results, traffic accident investigations, and the like. The historical loss data may be compiled and/or configured for accessing in any desired manner, including, charts, graphs, images, and text. In one embodiment, a damage evaluation tool or module including a guide or template to estimate the extent of vehicle damage may utilize the historical loss data with the crash information to determine a treatment complexity level for treating the damaged vehicle. For example, stored images and operating characteristics of like vehicles damaged in other collisions may be used to compare with similar perspectives of images and operating characteristics of the vehicle damaged in the crash. Further, impact aspects of the damaged vehicle may be compared with impact aspects of similarly damaged vehicles involved in past collisions.

The compilation of impact characteristics associated with known vehicle damage from similar vehicles experiencing similar damage(s) may be used as a guide or template to determine, evaluate, or calculate an estimate of the amount or level of damage that occurred to the vehicle involved in the crash. Referring again to FIG. 1A, the system 100 analyzes the crash information 104 to determine an estimate of vehicle damage to the damaged vehicle. In one example embodiment, the system 100 calculates the damage estimate by comparing the crash information 104 with the collision data of a like vehicle stored in the vehicle data information memory 106. The collision data includes records or compilations of information including vehicle attributes of other vehicles damaged in other collisions, such as historical loss information, images of damaged vehicle, sensor and telematics device information, VIN data, and scientific and empirical analyses of vehicle damage calculations and evaluations. The collision data may be categorized and/or correspond to the specialty vehicle data identifier template 120 and its plurality of segments 122. More specifically, collision information may be organized by one or more vehicle attributes represented within the specialty vehicle data identifier template 120. For example, collision information may be categorized by a vehicle type, e.g., make, model, and/or trim level; vehicle manufacture; and/or vehicle owner. The vehicle data information stored in the memory 106 of the system and/or operatively coupled to the processing center may be periodically updated with new acquired collision data.

A treatment level for treating the damaged vehicle can be calculated based on the estimated vehicle damage. Various levels of vehicle damage may be equated with various levels of vehicle treatment. That is, the estimated extent of vehicle damage can be equated to a treatment complexity level. The treatment complexity level is an estimate indicating the level of difficulty involved with treating the damaged vehicle. The treatment of the vehicle may include repairing or replacing damaged vehicle parts, and in some instances where repairing the vehicle is not desired, salvaging or scrapping the damaged vehicle. For example, minor, medium, major, and irreparable vehicle damage can be equated to minor repair, medium repair, major repair, and salvage and/or scrap treatment, respectively. Once the vehicle treatment complexity level has been calculated, it may be utilized by system personnel and/or the processing center 102 to identify a vehicle treatment facility 112 capable of performing the requisite treatment. A vehicle transporter 114 may be contacted by system personnel and/or the processing center 102 to transport the damaged vehicle from the crash site to the identified treatment facility 112, e.g., a service repair center or a scrapping and/or salvaging facility. In instances where the damaged vehicle is determined to be beyond repair, e.g., total loss, and transported to a salvage treatment facility, undamaged vehicle parts may be salvaged from the irreparably damaged vehicle and stored at a warehouse 116 for reuse and resale.

Figure 2:
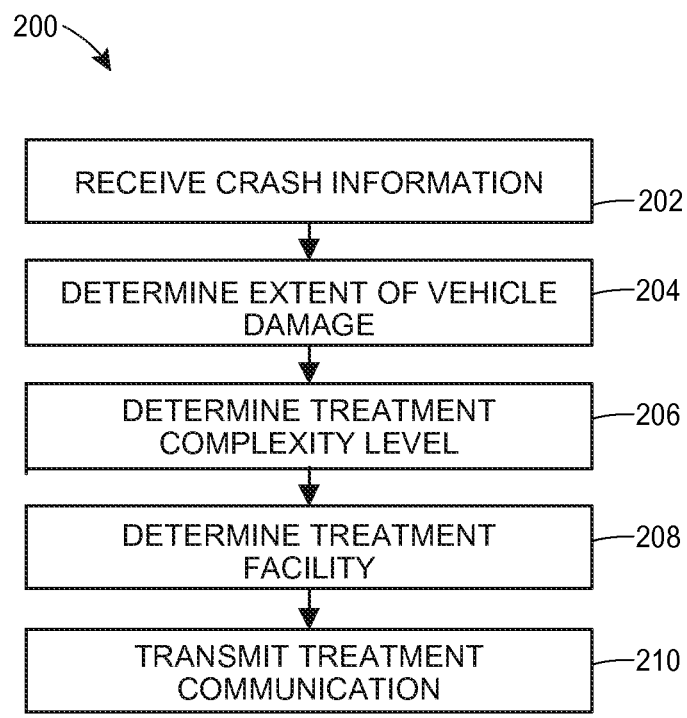
FIG. 2 depicts an example vehicle treatment process capable of being implemented in the vehicle treatment system illustrated in FIG. 1A in accordance with the embodiments described herein.

FIG. 2 is a flow diagram 200 depicting an example embodiment of a vehicle treatment process that may be implemented by the treatment system 100 shown in FIG. 1A. More particularly, the method 200 may be executed separately or cooperatively by system personnel and/or the processing center 102. Vehicle crash information, which may be provided to system personnel and/or the processing center 102 by a vehicle occupant or emergency responder communicating aspects or characteristics of the crash, is received for analysis (block 202). The crash characteristics may include information described above, such as the specialty vehicle data identifier or portions thereof, descriptions of the approximate speed the damaged vehicle was moving at the time of the crash, the location where the damaged vehicle was damaged, the type of damage to the damaged vehicle, whether the damaged vehicle can be operated and/or moved, whether the airbags or other safety systems of the damaged vehicle were deployed as a result of the crash, etc.

Crash characteristics of the damaged vehicle may also be provided to system personnel and/or the processing center 102 by the engine control unit (ECU) and/or one or more telematics devices of the damaged vehicle that are capable of monitoring and/or noting various vehicle operating functions, e.g., acceleration, velocity, and/or direction of the damaged vehicle at the time of the crash, sometimes referred to as event data recording (EDR). For example, vehicle operating information, e.g., acceleration, velocity, and/or direction of the vehicle, may be periodically monitored when the vehicle is moving. When a crash occurs, the monitored speed and direction of the vehicle may be automatically attained by one of more of the telematics devices and transmitted to system personnel and/or the processing center 102 as crash characteristics.

When the crash information is received by system personnel and/or the processing center 102, the crash information is analyzed or evaluated to determine an estimate of the extent of damage caused to the vehicle during the crash (block 204). The analysis may include calculating the extent of damage by comparing the crash information 104 to collision data. Based on the estimated vehicle damage, the treatment complexity level is determined (block 206). Once the estimated treatment complexity level is determined, one or more treatment facilities capable of performing the requisite treatment level may be identified by system personnel and/or the processing center (block 208). System personnel and/or the processing center 102 may then transmit a communication related to the treatment of the damaged vehicle (block 210). For example, system personnel and/or the processing center 102 may contact one or more identified treatment facilities to initiate transportation of the damaged vehicle to the treatment facility and/or inquire further in regard to treatment of the damaged vehicle.

Figure 3:
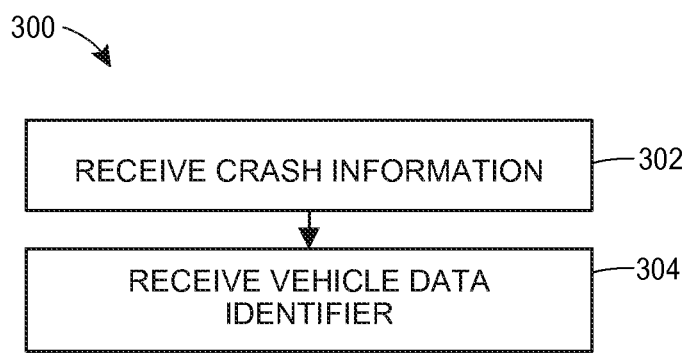
FIG. 3 depicts an example method for gathering or receiving crash information in accordance with the embodiments described herein.

A flow diagram 300 of an example embodiment for receiving vehicle crash information is depicted in FIG. 3. Crash information may be received (block 302) by system personnel and/or the processing center 102 from an individual(s) present at the crash site, such as a vehicle occupant or an emergency responder. The crash information may include or be associated with one or more segments of the specialty vehicle data identifier of the damaged vehicle (block 304). The damaged vehicle's specialty vehicle data identifier or portions thereof may be available to system personnel and/or the processing center prior to receiving the crash information. The driver of the damaged vehicle may be in contact with system personnel and/or the processing center 102 and provide operating characteristics of the damaged vehicle at about the time of the crash, e.g., the approximate speed the damaged vehicle was moving at the time of the crash, where the damaged vehicle was damaged, descriptions and/or images of the damaged vehicle, whether the damaged vehicle can be started and/or operated (e.g., driven), whether the damaged vehicle's airbags or other safety systems were deployed as a result of the crash, etc.

In vehicle treatment systems where telematics devices and vehicle sensors are coupled to the vehicle, the crash information may be automatically provided to system personnel and/or the processing center 102 by the EDR and/or advanced automatic collision or crash notification (AACN) system of the damaged vehicle. In particular, while the vehicle is being operated, the vehicle operating information may be monitored by a series of measurements of operating conditions or characteristics pertaining to the operation of the vehicle. For example, one or more computing devices such as a mobile computing device, an on-board computing device, and/or a server device may be communicatively coupled to sensors such as an accelerometer array operatively coupled to the vehicle. The accelerometer array may measure the acceleration of the vehicle along several axes and/or travelling directions. Measured operating information such as vehicle acceleration, velocity, and direction may be logged periodically (e.g., every millisecond, every second, etc.) or conditionally on the occurrence or detection of an event (e.g., a crash) and stored in the system 100, for example, as an event log (e.g., crash log) in a data storage unit of the system or a remote storage unit communicatively coupled to the system. The crash log may include a timestamp to note the time of the measurement.

Detection of a vehicle crash may be facilitated by the use of the accelerometer. For example, a crash may be detected when a computing device operatively coupled to the accelerometer notes a significant, near immediate increase or decrease in the monitored acceleration in the fore-aft, lateral, and/or vertical direction of the vehicle, e.g., X, Y, and Z axes. Additionally or alternatively, a crash may be detected by a GPS unit via detection of a significant increase or decrease in vehicle velocity, through a lack of change in GPS position coupled with other incoming crash information, or through near-simultaneous activation of an emergency response such as the deployment of an air-bag or an alert, e.g., automatic collision notification (ACN), etc.

In one example configuration, system personnel and/or the processing center 102 may determine, derive, or deduce additional crash information. In particular, the vehicle acceleration at the time of the crash may be considered primary crash information, wherein additional, or secondary, crash information may include a crash velocity and/or a crash direction, which may be mathematically derived by a computing device operatively coupled to the damaged vehicle, system personnel, and/or the processing center 102 from the acceleration monitored and/or measured via the accelerometer and/or the onboard computing device. More particularly, the system's 100 computing device(s) may measure, via the accelerometer array, acceleration associated with the vehicle in the X, Y, and/or Z axes and create accelerometer logs. In some embodiments, the X-axis may be oriented along a front-back axis aligned with the vehicle and/or mobile and/or on-board computing device, the Y-axis may be oriented along a side-side axis aligned with the vehicle and/or mobile or on-board computing device, and the Z-axis may be oriented along a top-bottom axis aligned with the vehicle and/or mobile and/or on-board computing device. However, these axes may be positioned in other ways.

Figure 4:
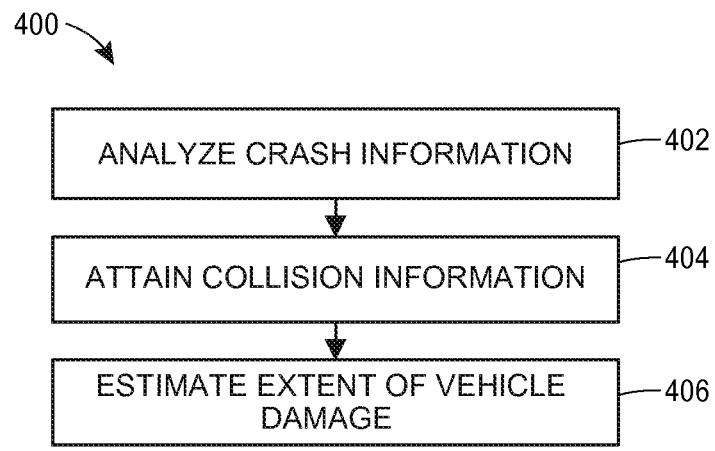
FIG. 4 depicts an example method for estimating, evaluating, and/or analyzing the extent of vehicle damage in accordance with the embodiments described herein.

A flow diagram 400 of an example embodiment for evaluating or calculating an estimate of the extent of vehicle damage is depicted in FIG. 4. Some or all of the method for determining the extent of vehicle damage may be implemented by the onboard computing system, system personnel, and/or the processing center 102. In particular, system personnel may utilize crash characteristics provided by an individual present at the crash site, such as the driver and/or occupant of the damaged vehicle and/or an emergency responder. Alternatively, or in addition thereto, the crash information may also have been automatically provided by telematics devices and an array of vehicle sensors operatively coupled to the damaged vehicle. System personnel, the processing center 102, and/or the onboard computing device may then analyze the crash information (block 402). In one example embodiment, system personnel and/or the processing center 102 may be provided with crash information in the form of operating information and/or images of the damaged vehicle. System personnel may then analyze the operating information and/or images to estimate the extent of vehicle damage that occurred during the crash. In another example embodiment, system personnel and/or the processing center 102 may attain collision data associated with the same or similar vehicle type (e.g., make, model, and/or trim level) of the damaged vehicle (block 404) and compare the crash information with the collision data. The collision data may be stored in a memory, e.g., database, and include historical loss information of a similar vehicle type to that of the damaged vehicle and be compiled from past collisions and/or from laboratory crash test results. The collision data may further include one or several combinations of impact or collision characteristics that are equated to and/or associated with a known amount of vehicle damage. For example, a list of vehicle parts likely to need repair and/or replacement may be associated with one or more collision aspects, such as vehicle operating characteristics at the time of a collision, images of vehicle damage, and other descriptions of vehicle damage. By comparing the crash characteristics of the damaged vehicle to the collision characteristics of the collision data, an estimation of the extent of damage to the damaged vehicle may be determined (block 406), and further equated to a list of vehicle parts likely to have been damaged in the crash. In addition, a list of vehicle parts likely to have not been damaged in the crash may also be automatically determined from the comparison of the crash characteristics of the damaged vehicle and the collision data.

Figure 5:
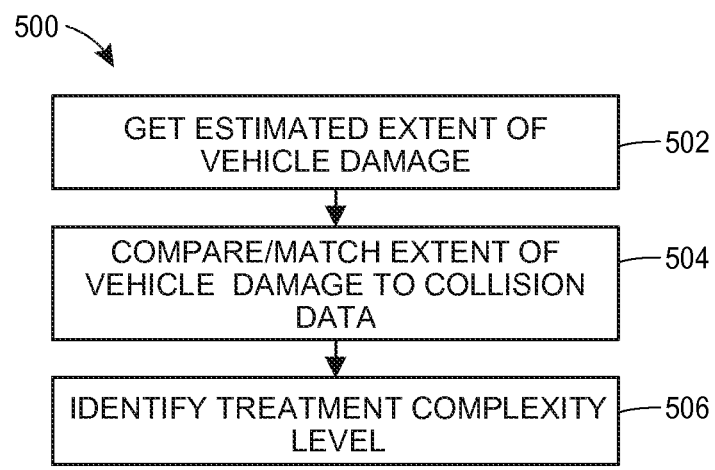
FIG. 5 depicts an example method for determining the treatment complexity level of the damaged vehicle in accordance with the embodiments described herein.

FIG. 5 depicts a flow diagram 500 of an example embodiment by which system personnel and/or the processing center 102 may determine the treatment complexity level for treating the damaged vehicle. The estimated extent of vehicle damage is attained by system personnel and/or the processing center 102 (block 502), and may include a list of vehicle parts estimated to be damaged by the crash. By comparing and matching the list of damaged vehicle parts to the vehicle collision data (block 504), system personnel and/or the processing center 102 may identify the requisite treatment complexity level (block 506). For example, each damaged vehicle and/or vehicle part may be associated with a treatment complexity level associated with the treatment skill level and time to repair, replace, or scrap the damaged vehicle and/or vehicle part. Further, the collision data may include a range of treatment complexity levels associated with various amounts of vehicle damage. In general, the treatment complexity level represents the difficulty associated with treating the damaged vehicle and may include or be associated with a pricing schema having a predetermined price structure for treating the damaged vehicle. The pricing schema may include the expected time and costs involved with treating the damaged vehicle based on the estimated list of damaged vehicle parts. A range of vehicle treatment complexity levels may be delineated by the amount of involvement associated with repairing and/or replacing vehicle parts of the damaged vehicle, or to scrap the damaged vehicle. Each treatment complexity level may include estimates or indications of the repair time, requisite repair skill level, and the cost associated with the type and amount of vehicle body parts that may be damaged, e.g., body panel (front, side, rear, quarter-panel, rocker, driver-side, and passenger-side), bumper, radiator, lights, water pump, battery, struts, frame, and gas tank.

There may be several levels of treatment complexity including a speed or light repair, a medium or moderate repair, a heavy or severe repair, not repairable, scrap, and salvage, for example. A speed or light repair treatment complexity designation may indicate or estimate that one or two vehicle parts need repair or replacement, or that minor refinishing may be required, but that no structural damage occurred to the vehicle. For example, a vehicle damage estimate requiring less than 10 hours of repair time or $1000 in vehicle parts and labor may be designated as a low treatment complexity level.

A medium or moderate repair treatment complexity designation may indicate that a few damaged vehicle parts require repair or replacement by skilled vehicle treatment personnel, or that light structural damage occurred to the vehicle. For example, a vehicle damage estimate requiring between 10-15 hours of repair time or between $1000-$2500 in vehicle parts and labor may be designated as a medium treatment complexity level.

A heavy or extensive repair treatment complexity designation may indicate that the vehicle is not drivable, significant structural damage occurred to the vehicle, more than five vehicle parts need repair or replacement, a welded-on vehicle component needs replacement, and/or that such repairs should be performed by highly skilled vehicle treatment personnel. For example, a vehicle damage estimate requiring between 15-30 hours of repair time or between $2500-$5000 in vehicle parts and labor may be designated as a high treatment complexity level.

A scrap or salvage treatment complexity designation may indicate that the vehicle is to be scrapped and not repaired. Prior to scrapping, the damaged vehicle may be dismantled to salvage any undamaged or usable vehicle parts. For example, a vehicle damage estimate requiring more than 30 hours of repair time, or having costs in replacement vehicle parts and labor greater than the market value of the damaged vehicle in an undamaged condition may be designated as a scrapping treatment complexity level.

In addition to the time, cost, and expertise level of treatment personnel to repair, salvage, and/or scrap the damaged vehicle, other factors that may be considered in determining the treatment complexity level include the damaged vehicle type, e.g., make, model, and/or trim level, construction materials, and the availability and/or market desirability for undamaged vehicle parts. For example, an older model vehicle may be more expensive to repair because replacement vehicle parts may be more costly or difficult to obtain. Such considerations may affect the outcome of the determination to repair or salvage the damaged vehicle. If a repair level has been determined, a repair treatment facility may be selected. At a minimum, the selected repair treatment facility is capable of performing the level of repair necessary. Another factor that may be considered when determining a vehicle treatment facility may include the proximity of the vehicle treatment facility to the damaged vehicle, e.g., crash site; the availability of a vehicle treatment facility to treat the damaged vehicle; and, a current or prior business relationship between the vehicle treatment facility and the entity using and/or administrating the treatment system 100.

Figure 6:
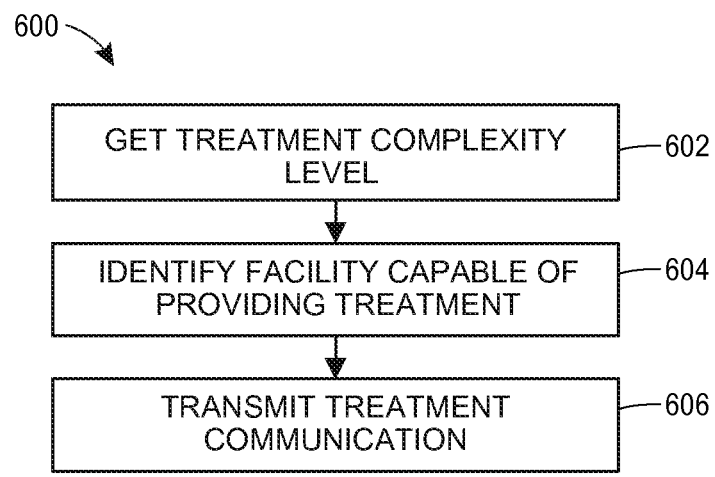
FIG. 6 depicts an example method for determining the treatment facility in accordance with the presently described embodiments.

FIG. 6 depicts a flow diagram 600 of an example method for identifying the treatment facility for treating the damaged vehicle. Once the treatment complexity level is estimated, system personnel and/or the processing center 102 may begin to determine the identity of an appropriate treatment facility for the damaged vehicle. The treatment complexity level is attained (block 602) and may be compared by system personnel and/or the processing center 102 to a list of treatment facilities that may be capable of providing the estimated treatment (block 604) for the damaged vehicle. Matching the estimated treatment complexity level with the treatment facilities in the list may be based on one or more factors, such as a pricing structure, treatment facility capability, treatment facility location, treatment facility quality rating and/or certification, treatment facility availability, vehicle treatment time, etc., and combinations thereof. One or more of these factors may also be weighted and/or prioritized by system personnel and/or the processing center 102 when considering and determining a treatment facility for treatment of the vehicle. For example, a low complexity treatment generally may not require treatment to be performed by treatment personnel with a high skill level. Thus, for a low complexity treatment, the location of the treatment facility may have more weight and/or be prioritized over other considered factors during the determination of the treatment facility. For medium or high complexity treatments, the skill level and/or performance record of the treatment facility may be considered to be more important and thus weighted and/or prioritized over some of the other factors.

When a treatment facility is identified, a communication relating to the treatment of the damaged vehicle may be sent by system personnel and/or the processing center 102 (block 606). For example, the processing center 102 may transmit information associated with the vehicle treatment in the form of an SMS text, e-mail, phone call, facsimile, software update, social media broadcast, etc., to the identified treatment facility. Alternately, or in addition, the information may be transmitted to the vehicle owner and/or other entities authorized by the vehicle owner, such as a collision repair facility, a vehicle scrap facility, emergency personnel, an insurance agent, etc. Such information may be transmitted in the form of an SMS text, e-mail, phone call, facsimile, software update, social media broadcast (e.g., Facebook, Twitter), etc. Additional examples of the information associated with vehicle treatment transmitted by the processing center 102 may include or relate to a request for a proposal to treat the damaged vehicle or a request to transport the damaged vehicle from the crash site. Such information may be transmitted to a treatment facility or a vehicle transporter.

Figure 7:
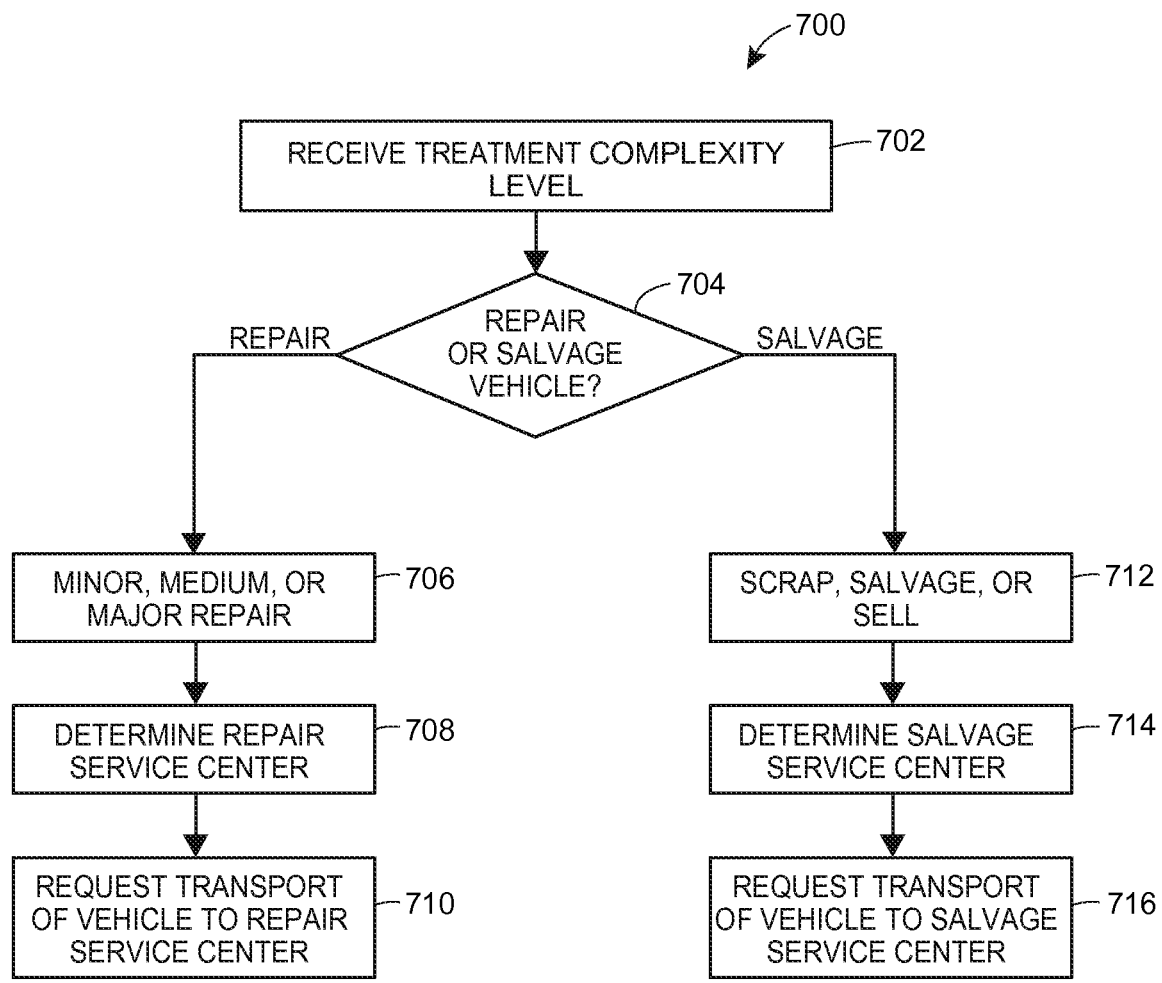
FIG. 7 depicts an example method for treating the damaged vehicle in accordance with the embodiments described herein.

Another example method for identifying the treatment facility for treating the damaged vehicle is depicted in the flow diagram 700 shown in FIG. 7. System personnel and/or the processing center 102 receive the treatment complexity level (block 702), which may then be analyzed and/or evaluated with collision data. The vehicle collision data may comprise empirical data including measurements of damaged vehicles of the same or similar type to that of the vehicle damaged in the crash. Based on the analysis and/or evaluation, a determination of the type of treatment for the damaged vehicle may be made, generally, to repair, salvage, and/or scrap the vehicle (block 704). For example, the determination of the type of treatment may be made by system personnel and/or the processing center 102 through an analysis of the crash information and/or a comparison of one or more characteristics of the damaged vehicle crash information to a hierarchy of vehicle collision data of similar type vehicles.

If the damaged vehicle is to be repaired, an extent of the repairs may be determined (block 706). The range of repair levels may vary from minor to medium to major and the range may be segmented in relation to the treatment complexity levels. In other words, a particular treatment complexity level may be associated with a range of vehicle damages. Additional factors that may also be considered in determining the treatment complexity level include the type, e.g., make, model, and/or trim level, construction materials of the damaged vehicle, the availability and/or market desirability for undamaged vehicle parts of that vehicle type, the proximity of the repair treatment facility to the damaged vehicle, e.g., crash site; the treatment facility's availability to timely repair the vehicle; and, a current or prior business relationship between the repair treatment facility and the entity using and/or administrating the treatment system 100. For example, an older model vehicle may be more expensive to repair because replacement vehicle parts may be more costly or difficult to obtain. Such considerations may affect the outcome of the determination to repair or salvage the damaged vehicle. When a repair level has been determined, a repair treatment facility may be selected from among several candidate repair treatment facilities (block 708). At a minimum, the selected repair treatment facility is capable of performing the level of repair necessary. Information associated with the repair of the damaged vehicle may be transmitted from system personnel and/or the processing center 102. Such information may include a request to transport the damaged vehicle from the crash site directly to the repair treatment facility (block 710). The request to transport the vehicle may be sent to the selected repair treatment facility or to a vehicle transporter 114 capable of transporting damaged vehicles from collision sites. Additionally, and/or alternatively, information associated with the repair of the damaged vehicle may be transmitted to an entity associated with the damaged vehicle, such as the vehicle owner and/or an insurance entity.

If the damage to the vehicle is too extensive or costly to be repaired, the damaged vehicle may be salvaged, scrapped, and or sold (block 712). In some instances where the damaged vehicle is determined to be a total loss, the damaged vehicle may be immediately sold or put up for auction or scrapped and shredded for its scrap metal. Scrapping the vehicle may be appropriate for low dollar, high curb weight vehicles where the value of the damaged vehicle is perceived to be in the scrap metal. In other instances, the damaged vehicle may be dismantled to salvage any value associated with the damaged vehicle. For example, if the damaged vehicle includes undamaged vehicle parts, the damaged vehicle may be dismantled and the undamaged vehicle parts may be harvested and stored in a storage facility 116 for later use and/or sale. The determination to sell or dismantle the damaged vehicle may include consideration of the treatment complexity level, the vehicle type, e.g., make, model, and trim level, and the market demand and/or desirability of particular harvested vehicle parts, e.g., at-risk vehicle parts for vehicles that are no longer in production. Additionally, a higher monetized recovery of the damaged vehicle may be attained if the damaged vehicle is partially repaired and/or dismantled to a varying extent, and then sold. For example, higher end and late model vehicles and/or vehicle parts may be prepared for sale. Such vehicles and vehicle parts, as well as rare or hard to find vehicles and vehicle parts may be privately or publicly sold or auctioned through a salvage treatment facility partnering with an entity using or administrating the treatment system 100.

Any unwanted vehicle parts that remain after dismantling may be shredded or scrapped. Once the salvage level has been determined, a salvage treatment facility may be identified from among prospective salvage treatment centers (block 714). At a minimum, the selected salvage treatment facility is capable of performing the level of salvage necessary. Additional factors may also be considered to determine a particular salvage treatment facility. For example, the proximity of the salvage treatment facility to the damaged vehicle, e.g., crash site. Further considerations for determining a salvage treatment facility may also include the availability to timely salvage the vehicle, the existence of a current or prior business relationship between the salvage treatment facility and the entity using or administrating the treatment system 100, etc. When the salvage treatment facility is determined, information associated with the salvage of the vehicle may be transmitted by system personnel and/or the processing center 102. Such information may include a request to transport the vehicle to the identified salvage treatment facility (block 716). The request to transport the vehicle may be sent to the selected salvage treatment facility 112 or to a vehicle transporter 114 capable of transporting the damaged vehicle from the crash site to the salvage treatment facility.

Figure 8:
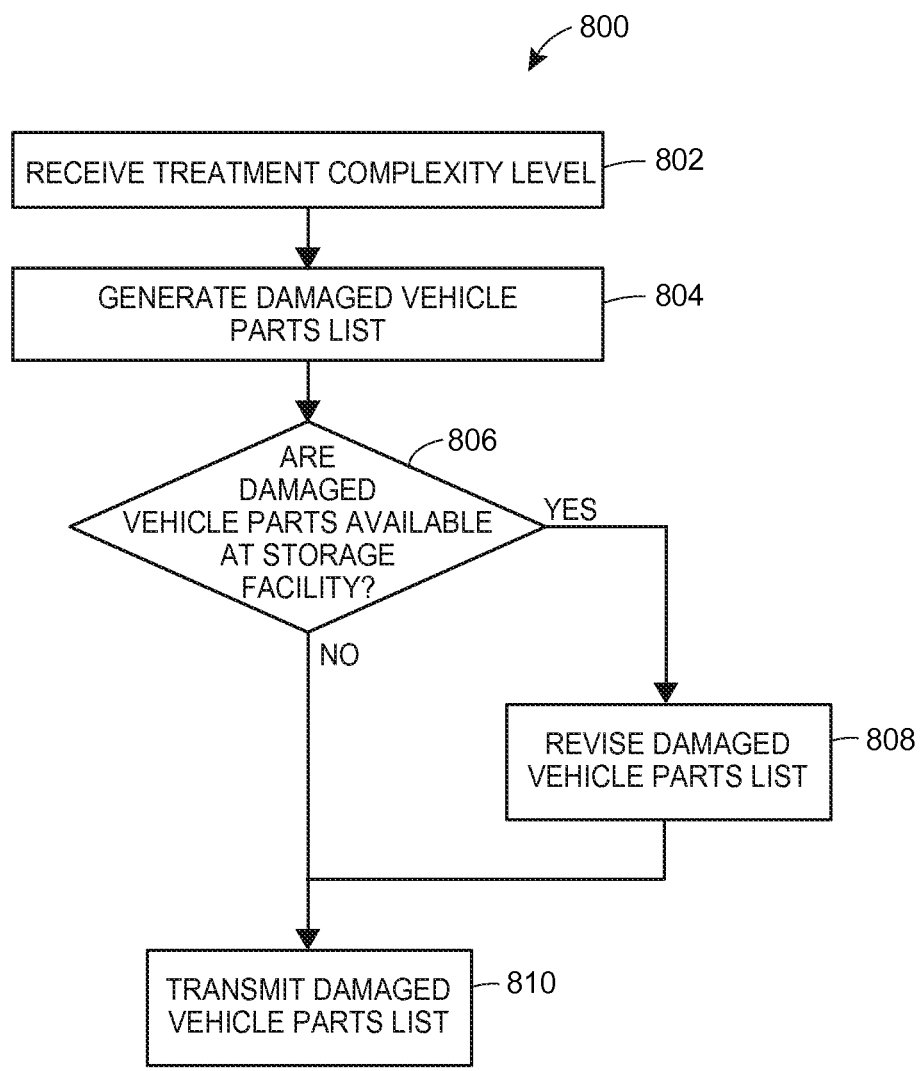
FIG. 8 depicts another example method for treating the damaged vehicle in accordance with the embodiments described herein.

To further facilitate the treatment of the damaged vehicle, additional information may be transmitted by system personnel and/or the processing center 102 of the treatment system 100. In some instances, a request for a proposal (RFP) to treat the damaged vehicle may be generated and sent to selected treatment facilities, e.g., repair or salvage centers. An example process for including information related to the damaged vehicle with an RFP to treat the damaged vehicle is illustrated in the flow diagram 800 shown in FIG. 8. The RFP may be generated based in part on the vehicle treatment complexity level (block 802) received by system personnel and/or the processing center 102 and/or any other information, such as the make, model, and year of the damaged vehicle, as well as a time and/or cost limitation for treatment. In particular, a list of damaged vehicle parts may be generated (block 804) by system personnel and/or the processing center 102 based on the crash information and transmitted to a prospective treatment facility, a prospective vehicle parts supplier, and/or the vehicle owner (block 810). The generated list of damaged vehicle parts may include a list of vehicle parts likely to have been damaged in the crash as reflected by the vehicle treatment complexity level and may be sent along with the RFP for treating the damaged vehicle. The RFP responses received from the various treatment facilities may be analyzed and compared by system personnel and/or the processing center 102 to select a repair treatment facility for repairing the damaged vehicle. Such analyses may consider the time to repair the damaged vehicle, the work quality history of the repair treatment facility, etc.

Prior to writing the RFP for treating the damaged vehicle, system personnel and/or the processing center 102 may compare the list of damaged vehicle parts to an inventory list of undamaged vehicle parts stored at a storage facility 116 or storage center (block 806). The undamaged vehicle parts stored in the storage facility 116 may have been harvested from previously scrapped or salvaged vehicles. System personnel and/or the processing center 102 may revise the list of damaged vehicle parts to indicate undamaged vehicle parts that are available at the storage facility 116 (block 808) and correspond to any of the damaged vehicle parts. A repair treatment facility providing a quote in response to the RFP may then utilize the information of available undamaged vehicle parts in preparing its response to the request for proposal for repairing the damaged vehicle. For example, the prospective repair facilities may be provided with the opportunity to purchase one or more salvaged vehicle parts stored at the storage facility in its repair quote. Additionally, the cost and availability of a particular vehicle part stored at the storage facility may also be presented to the vehicle owner in the form of the damaged and/or undamaged vehicle parts list and the like, wherein the vehicle owner is provided with the opportunity to select and purchase a particular vehicle part from the storage facility 116. The vehicle owner may select and purchase all, none, or some of the vehicle parts held in the storage facility 116.

Figure 9:
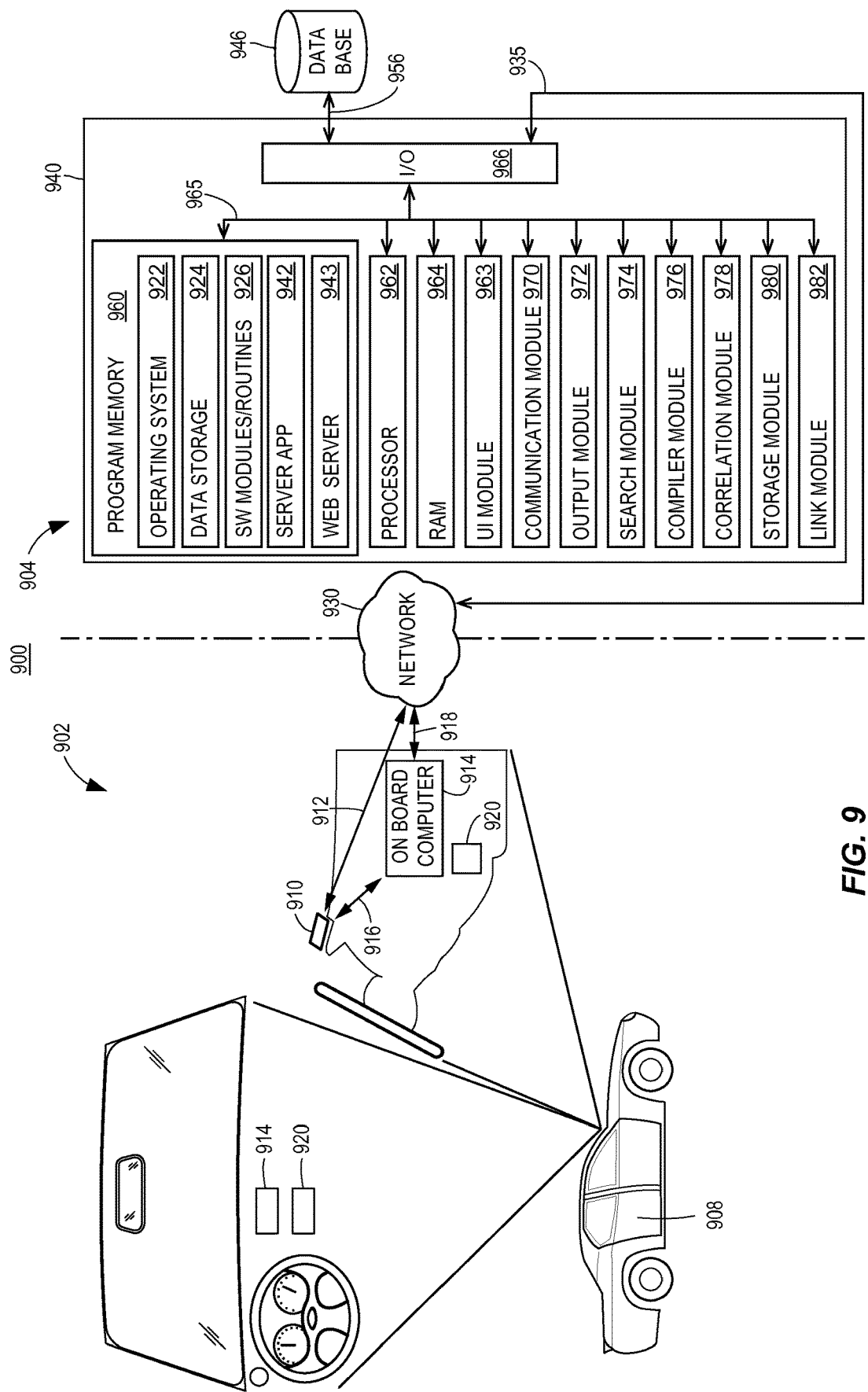
FIG. 9 is a block diagram depicting a mobile computing device, an on-board computing device, a server device, and a communication network that may configured in the example system for treating a damaged vehicle in accordance with the embodiments described herein.

FIG. 9 illustrates a block diagram of an example treatment system 900 capable of being incorporated into the treatment system 100 shown in FIG. 1A and supporting the processes described herein for treating a vehicle damaged in a crash. The high-level architecture of the vehicle treatment system 900 includes both hardware and software modules as well as various data communications channels for communicating information there between. The vehicle treatment system 900 may be divided into front-end 902 and back-end 904 segments. The front-end segment 902 includes one or more computing devices, such as a mobile computing device 910 and/or an on-board computing device 914; and the back-end segment 904 includes a computing device 940, such as server device. One or more components and functionality of the front-end 902 and back-end 904 segments, e.g., computing device, module, database; may be included and operatively configured within the processing center 102 described in FIG. 1.

The mobile computing device 910 may be a general-use mobile personal computer, cellular phone, smartphone, tablet computer, wearable computer (e.g., a watch, glasses, etc.), or a device dedicated to facilitating treatment of a damaged vehicle. The on-board computing device 914 may be a general-use on-board computer capable of performing the functions relating to vehicle operation or dedicated to facilitate treatment of a damaged vehicle. Either of the mobile computing device 910 or the on-board computing device 914 may include and/or be operatively coupled to a position module. The position module may use "Assisted GPS" (A-GPS), satellite GPS, or any other suitable global positioning protocol or system capable of locating the vehicle 908. For example, A-GPS utilizes terrestrial cell phone towers or Wi-Fi hotspots (e.g., wireless router points) to more accurately and more quickly determine the location of the vehicle 908 while satellite GPS is generally more useful in more remote regions that lack cell towers or Wi-Fi hotspots. In one embodiment, the position module facilitates the determination of the velocity and direction of the vehicle 908 via its coupling to the mobile computing device 910 and/or on-board computing device 914.

The mobile computing device 910 or the on-board computing device 914 may include and/or be operatively coupled to one or more telematics modules and/or sensors capable of communicating information associated with the vehicle, e.g., vehicle operating information. An accelerometer array is one example of a telematics device that may incorporate one or more accelerometers positioned to determine the acceleration and direction of movements of the mobile computing device 910 or the on-board computing device 914, which effectively correlates to the acceleration and direction of movements of the vehicle 908. In some embodiments, the accelerometer array may include an X-axis accelerometer, a Y-axis accelerometer, and a Z-axis accelerometer to measure the acceleration and direction of movement in each respective dimension. It will be appreciated by those of ordinary skill in the art that a three dimensional vector describing a movement of the vehicle 908 via the mobile computing device 910 or the on-board computing device 914 through three dimensional space can be established by combining the outputs of the X-axis, Y-axis, and Z-axis accelerometers using known methods. Single- and multi-axis models of the accelerometer are capable of detecting magnitude and direction of acceleration as a vector quantity, and may be used to sense orientation and/or coordinate acceleration of the vehicle 908.

In addition to the accelerometer array, another type of sensor that may be coupled to the mobile computing device 910 or the on-board computing device 914 includes an image capture module. The image capture module may be equipped with built-in cameras and/or peripheral cameras, such as webcams installed inside and/or outside the vehicle 908. The image capture module(s) may be oriented toward the front and/or rear of the vehicle 908 and may include an infrared illuminator to facilitate low light and/or night image capturing. Other types of sensors that may also be included within or be coupled to the mobile computing device 910 or the on-board computing device 914 include, and are not limited to: a thermometer, microphone, thermal image capture device, and a biomedical sensor.

The on-board computing device 914 may be installed by the manufacturer of the vehicle 908 or as an aftermarket modification to the vehicle. Further, the mobile computing device 910 and/or on-board computing device 914 may be a thin-client device that outsources some or most processing to the server device 940.

Either computing device 910, 914 may be permanently or removably attached to a vehicle 908 and may interface with various sensors coupled to the vehicle 908 (e.g., a speedometer, an accelerometer, a compass, a global position unit (GPS), etc.) and/or may interface with various external output devices in the vehicle 908, such as one or more tactile alert systems, one or more speakers, one or more displays, etc. The treatment system 900 may also include a notification alert system 920 (e.g., automatic collision notification (ACN), advanced automatic collision or crash notification (AACN), event data recorder (EDR)), which may record and/or transmit information associated with treating the vehicle 908 after being involved in a crash.

The mobile computing device 910 and on-board computing device 914 may communicate with one another directly over a wired or wireless link 916. In addition, the mobile computing device 910 and the on-board computing device 914 may communicate with a network 930 over wired and/or wireless links 912, 918. The network 930 may be a proprietary network, a secure public internet, a virtual private network, or some other type of network, such as dedicated access lines, plain ordinary telephone lines, satellite links, etc., and combinations thereof. Where the network 930 comprises the internet, data communications may take place over the network 930 via an internet communication protocol.

The mobile computing device 910 and on-board computing device 914 may be integrated into a single device that can perform the functions of both devices. It will be appreciated that functions performed by either the mobile computing device 910 or the on-board computing device 914 may also be performed through cooperation of the on-board computing device 914 and the mobile computing device 910. For example, the mobile computing device 910 and/or on-board computing device 914 may perform any and/or all of the processing associated with compiling or gathering crash information, determining a treatment complexity level based on the crash information, determining a treatment for the vehicle based on the a treatment complexity level; and transmitting information associated with the treatment of the vehicle.

Each of the mobile computing device 910 and the on-board computing device 914 is capable of performing all of the functions of the other computing device described herein or may supplement the functions performed by the other computing device. For example, the mobile computing device 910 may perform the various functions described herein in conjunction with the on-board computing device 914 or alone. Likewise, the on-board computing device 914 may perform the various functions described herein in conjunction with the mobile computing device 910 or alone. In either instance, the mobile computing device 910 or on-board computing device may not be present.

The front-end segment 902 may communicate with the back-end 904 segment via the communication network 930. The server device 940 of the back-end segment 904 may include a processor 962 adapted and configured to execute various modules and/or routines of the vehicle treatment system 900. The server device 940 may further include, and/or be coupled via an address/data link 956 to, a storage memory, e.g., database 946 adapted to store various modules, routines, and/or applications as well as data related to the operation of the vehicle treatment system 900. For example, the data stored within the memory 946 may include, for example, information collected by the mobile computing device 910 and/or the on-board computing device 914 pertaining to vehicle operating characteristics and uploaded to the server device 940, such as crash information corresponding to the methods discussed herein. Other kinds of information that may be stored in the memory 946 include historical vehicle collision information compiled from collision data involving vehicles categorized within the same or similar type of vehicle as the vehicle 908 and contact information relating to vehicle service repair facilities and/or salvage treatment facilities, vehicle parts suppliers, vehicle transporters, vehicle owner, vehicle insurance personnel, etc. The server device 940 may access or store data and/or modules in the memory 946 when executing various functions and tasks associated with the operation of the vehicle treatment system 900.

The server device 940 may also be operatively connected to the network 930 via a another communication link 935, which facilitates communication with additional databases capable of including information involved with the treatment system 100. Any of the storage memories accessible by the mobile computing device 910, the on-board computing device 914, and/or the server device 940 may include vehicle crash information, vehicle collision data, specialty vehicle data identifiers, VIN data, historical vehicle loss information, vehicle damage evaluation tools, damaged vehicle parts lists, inventory of vehicle parts stored at a storage facility, vehicle transporters, treatment centers, customer contact information, insurance agent/entity contact information, etc. Such information may be displayed in a variety of formats at the mobile computing device 910, the on-board computing device 914, and/or server device 940, wherein system personnel and/or the processing center 102 is provided access to such information for treating the damaged vehicle.

In addition to the processor 962 (e.g., microprocessor or a microcontroller), the server device 940 may include a program memory 960, a random-access memory (RAM) 964, input/output (I/O) circuitry 966, and one or more modules for facilitating treatment of a damaged vehicle. The program memory 960, processor 962, RAM 964, I/O circuitry 966, and other modules may be interconnected via an address/data bus 965. Although the I/O circuitry 966 is shown as a single block, the I/O circuitry 966 may include a number of different types of I/O circuits.

The program memory 960 includes an operating system 922 that may include one or more operating platforms; a data storage device 924; and a plurality of modules and/or routines 926. The program memory 960 may be configured to store computer-readable instructions that when executed by the processor 962 cause the server device 940 to implement one or more modules 926, a server application 942, and/or a web server 943. The plurality of module and/or routines 926, the server application 942, and/or the web server 943 may include a number of different programs, modules, routines, sub-routines, etc., that may separately or collectively cause the server device 940 to implement one or more of the processes described herein for treating the damaged vehicle.

Some example modules 926 capable of being executed by the processor 962 include, and are not limited to: a user interface module configured to facilitate interaction between the system 900 and the user; a communication module utilizing any suitable wired or wireless communication protocol, such as wireless telephony network (e.g., GSM, CDMA, LTE, etc.), a Wi-Fi network (802.11 standards), a WiMAX network, a Bluetooth network, etc., and configured to facilitate communication with the server device 940; an output module configured to provide an output such as the treatment complexity level in an accessible format, which may be stored in a memory device, displayed on a screen, or transmitted to another device capable of utilizing the output; a search module configured to receive a request for the treatment complexity level of the damaged vehicle and facilitate identification of each discrete specialty vehicle data identifier stored in the storage module or the memory 946, e.g., database; a compiler module configured to accumulate any identified vehicle crash information and/or specialty vehicle data identifiers into an output; a correlation module configured to correlate the received crash information with one or more segments of a specialty vehicle data identifier and/or a specialty vehicle data identifier template; a storage module facilitating storage of the correlated vehicle information into memory such as the memory 946; and a link module facilitating association of the correlated one or more segments of the received vehicle information with one or more discrete specialty vehicle data identifiers stored in memory, e.g., storage module and/or database 946.

While the user interface module, communication module, correlation module, storage module, link module, search module, compiler module, and output module described above may be configured and/or embodied in software and/or firmware, it is to be understood that any combination of these modules may be configured and/or embodied in software/firmware and/or hardware. For example, at least a portion of the user interface module may be integrated in a hardware user interface module 963, which may include a display screen, keyboard, mouse device, microphone, and/or speaker; at least a portion of the communication module may be integrated in a hardware communication module 970; at least a portion of the correlation module may be integrated in a hardware correlation module 978; at least a portion of the storage module may be integrated in a hardware storage module 980; at least a portion of the link module may be integrated in a hardware link module 982; at least a portion of the search module may be integrated in a hardware search module 974; at least a portion of the compiler module may be integrated in a hardware compiler module 976; and at least a portion of the output module may be integrated in a hardware output module 972. One or more of these hardware modules 963, 970, 972, 974, 976, 978, 980, 982 may be operatively coupled to the program memory 960, processor 962, memory device 964, and/or I/O circuit 966 via the communication bus 965.

Although the vehicle treatment system 900 is shown in the figures to include one processor 962, it is to be understood that the server device 940 may include multiple processors and/or microprocessors. Similarly, the memory may include multiple RAMs 964 and multiple program memories 960. The RAM(s) 964 and program memories 960 may be implemented as semiconductor memories, magnetically readable memories, and/or optically readable memories, for example. Further, while the instructions for the modules 926, server application 942, and web server 943 are shown being stored in the program memory 960, the instructions may additionally or alternatively be stored in the memory 946 and/or RAM 964.

Further, while the vehicle treatment system 900 is shown to include one server device 940, one mobile computing device 910, and one on-board computing device 914, it should be understood that more or less server devices, mobile computing devices, and on-board computing devices may be utilized. For example, the system 900 may include several server devices 940 and numerous mobile computing devices 910, all of which may be interconnected via the network 930. Additionally, the processing performed by the one or more server devices 940 may be distributed among a plurality of server devices configured in an arrangement known as cloud computing. This arrangement may provide several advantages, for example, enabling near real-time uploads and downloads of information as well as periodic uploads and downloads of information. The cloud computing arrangement may provide for a thin-client embodiment of the mobile computing device 910 and/or on-board computing device 914 as well as a primary backup of some or all of the data gathered by the mobile computing device 910, on-board computing device 914, and/or server device 940.

In an embodiment where the mobile computing device 910 and/or on-board computing device 914 is configured as a thin-client device, the server device 940 may remotely perform many of the processing functions that may otherwise be performed by system personnel and/or the mobile computing device 910 and/or on-board computing device 914. In such embodiments, the server device 940 may include a number of software applications capable of receiving vehicle operating information gathered by the sensors and/or acquiring collision data to be used in determining the extent of damage to the vehicle 908 involved in the crash. For example, the mobile computing device 910 and/or on-board computing device 914 may gather information from its sensors as described herein, but instead of using the information locally, the mobile computing device 910 and/or on-board computing device 914 may send the information to the server device 940 for remote processing. The server device 940 may perform the analysis of the gathered crash information to determine the amount of damage to the vehicle 908 as described herein. The server device 940 may then determine the type of treatment for the damaged vehicle, e.g., repair, salvage, scrap, and/or sell; and where the damaged vehicle may be taken for such treatment. The server device 940 may also transmit information associated with the treatment of the damaged vehicle. For example, the information transmitted by the server device 940 may be sent to a treatment facility and/or a transport facility and include a request to transport the damaged vehicle to the treatment facility, or the server device 940 may transmit the information to the mobile computing device 910 and/or on-board computing device 914.

Figure 10:
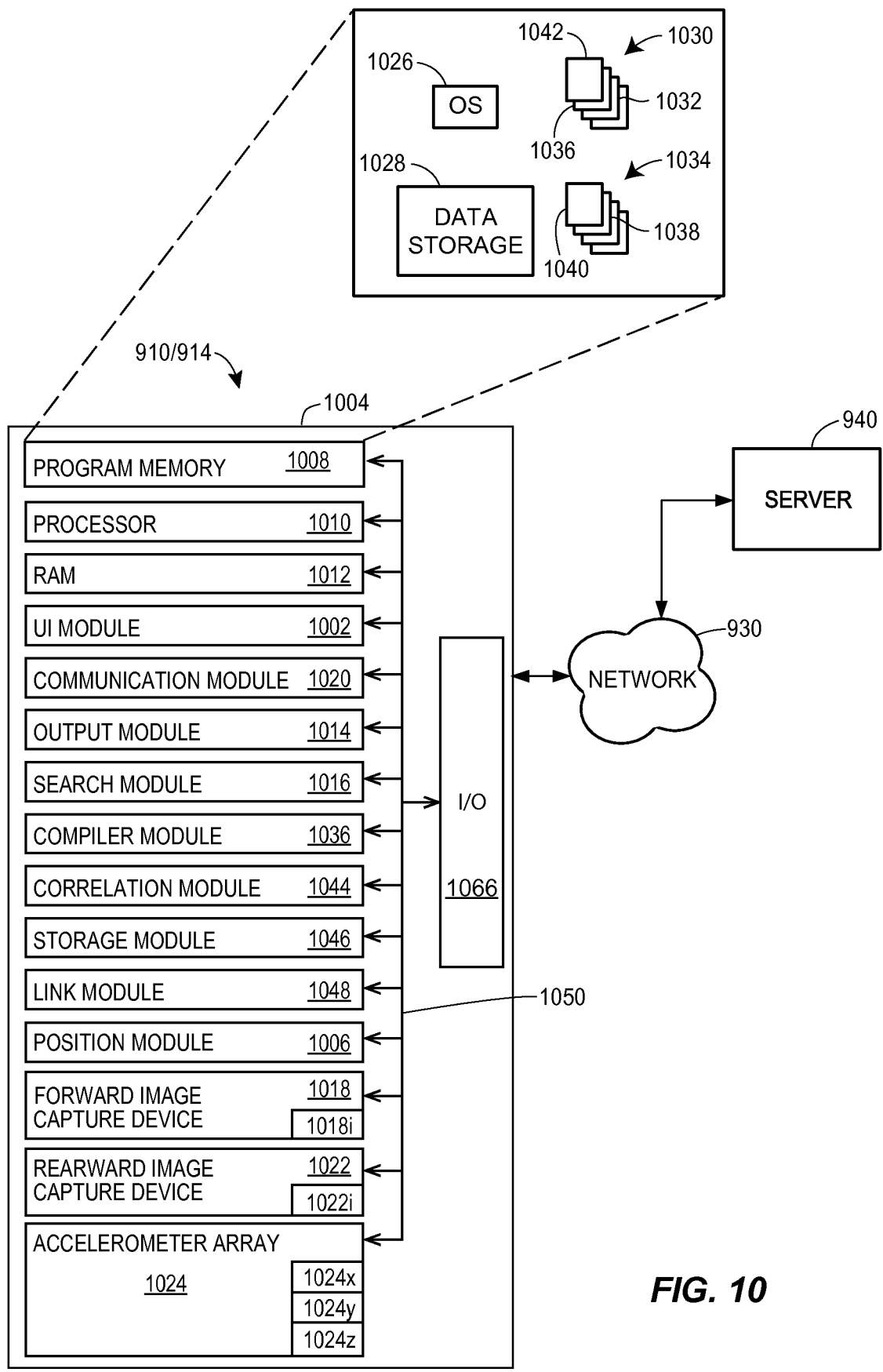
FIG. 10 is a block diagram of an example mobile computing device, on-board computing device, and/or server device capable of being implemented in the system shown in FIG. 9.

Another example treatment system capable of being incorporated into the treatment system 100 shown in FIG. 1A and supporting the processes described herein for treating a vehicle damaged in a crash is illustrated in FIG. 10. The system includes a mobile server device 1004, which may be viewed in many regards as an integration of much of the functionality of the mobile computing device 910, the on-board computing device 914, and/or the server device 940 described with respect to FIG. 9. The server device 1004 may be operatively connected to the server device 940 and/or network 930 via one or more communication links. Similar to the server device 940 described earlier in FIG. 9, the remote server device 1004 may include a program memory 1008, one or more microprocessors 1010, a random-access memory (RAM) 1012, an input/output (I/O) circuitry 1016, and one or more modules for facilitating treatment of a damaged vehicle—all of which may be interconnected via an address/data bus 1050. Although the I/O circuitry 1016 is depicted in FIG. 10 as a single block, the I/O circuitry 1016 may include a number of different types of I/O circuits.

The program memory 1008 includes an operating system 1026, a data storage module 1028, a plurality of modules 1030, e.g., applications, and a plurality of routines 1034. The operating system 1026 may include one of a plurality of mobile platforms such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively.

The data storage module 1028 may include application data for the plurality of modules 1030, routine data for the plurality of routines 1034, and other information involved with the treatment system 100, for example, crash information, vehicle collision data associated with a vehicle type that includes the vehicle 908, specialty vehicle data identifiers, VIN data, images, historical vehicle loss information, vehicle damage evaluation tools, damaged vehicle parts list, inventory of vehicle parts stored at a storage facility, vehicle transporters, vehicle treatment centers, customer contact information, insurance agent/entity contact information, etc.

The program memory 1008 may be configured to store computer-readable instructions that when executed by the processor 1010 cause the server device 1004 to implement one or more modules 1030 and/or routines 1034, which when executed separately or collectively by the processor 1010 causes the server device 1004 to implement one or more of the processes described herein for treating a damaged vehicle. In addition, the one or more processors 1010 may be adapted and configured to execute any of the plurality of software applications 1030 and/or any of the plurality of software routines 1034 residing in the program memory 1008, in addition to other software applications. For example, one of the plurality of modules 1030 may be a client application 1032 that may be implemented as a series of machine-readable instructions for performing the various functions associated with implementing the vehicle treatment system as well as receiving information at, displaying information on, and transmitting information from the server device 1004. One of the plurality of modules 1030 may be a native web browser 1036, such as Apple's Safari®, Google Android™ mobile web browser, Microsoft Internet Explorer® for Mobile, Opera Mobile™, that may be implemented as a series of machine-readable instructions for receiving, interpreting, and displaying web page information from the server device 1004 while also receiving inputs from the vehicle operator. Another module of the plurality of modules may include an embedded web browser 1042 that may be implemented as a series of machine-readable instructions for receiving, interpreting, and displaying web page information to and/or from the server device 1004.

Some additional modules capable of being executed by the processor 1004 include, and are not limited to: a user interface module configured to facilitate interaction between the system and the user; a communication module utilizing any suitable wired or wireless communication protocol, such as wireless telephony network (e.g., GSM, CDMA, LTE, etc.), a Wi-Fi network (802.11 standards), a WiMAX network, a Bluetooth network, etc., and configured to facilitate communication with the server device 1004; an output module configured to provide an output such as the treatment complexity level in an accessible format, which may be stored in a memory device, displayed on a screen, or transmitted to another device capable of utilizing the output; a search module configured to receive a request for the treatment complexity level of the damaged vehicle and facilitate identification of each discrete specialty vehicle data identifier stored in the storage module or the data storage 1028; a compiler module configured to accumulate any identified vehicle crash information and/or specialty vehicle data identifiers into an output; a correlation module configured to correlate the received crash information with one or more segments of a specialty vehicle data identifier and/or a specialty vehicle data identifier template; a storage module facilitating storage of the correlated vehicle information into memory such as the data storage 1028; and a link module facilitating association of the correlated one or more segments of the received vehicle information with one or more discrete specialty vehicle data identifiers stored in memory, e.g., data storage 1028.

While the modules described above may be configured and/or embodied in software and/or firmware, it is to be understood that any combination of these modules may be configured and/or embodied in software/firmware and/or hardware. For example, at least a portion of the user interface module may be integrated in a hardware user interface module 1002, which may include a display screen, keyboard, mouse device, microphone, and/or speaker; at least a portion of the communication module may be integrated in a hardware communication module 1020; at least a portion of the correlation module may be integrated in a hardware correlation module 1044; at least a portion of the storage module may be integrated in a hardware storage module 1046; at least a portion of the link module may be integrated in a hardware link module 1048; at least a portion of the search module may be integrated in a hardware search module 1016; at least a portion of the compiler module may be integrated in a hardware compiler module 1036; and at least a portion of the output module may be integrated in a hardware output module 1014. One or more of these hardware modules 1002, 1020, 1044, 1046, 1048, 1016, 1036, and 1014 may be operatively coupled to the program memory 1004, processor 1010, memory device 1012, and/or I/O circuit 1052 via the communication bus 1050.

The server device 1004 may further include a position module 1006 operatively coupled to the I/O circuit 1052 via address/data bus 1050. The position module 1006 may use "Assisted GPS" (A-GPS), satellite GPS, or any other suitable global positioning protocol or system capable of locating the vehicle 908 via the position of the server device 1004. For example, A-GPS utilizes terrestrial cell phone towers or Wi-Fi hotspots (e.g., wireless router points) to more accurately and more quickly determine the location of the vehicle 908 via the server device 1004 while satellite GPS is generally more useful in more remote regions that lack cell towers or Wi-Fi hotspots. The position module 1006 may also facilitate the determination of the velocity and direction of the vehicle 908, via the coupling of server device 1004 to the vehicle.

The server device 1040 may further include one or more telematics devices capable of communicating information associated with the vehicle, e.g., vehicle operating information. An accelerometer array 1024 is one example of a telematics device or module that may incorporate one or more accelerometers positioned to determine the acceleration and direction of movements of the server device 1004, which effectively correlate to the acceleration and direction of movements of the vehicle 908. In some embodiments, the accelerometer array 1024 may include an X-axis accelerometer $1024x$, a Y-axis accelerometer $1024y$, and a Z-axis accelerometer $1024z$ to measure the acceleration and direction of movement in each respective dimension. It will be appreciated by those of ordinary skill in the art that a three dimensional vector describing a movement of the vehicle 908 via the server device 1004 through three dimensional space can be established by combining the outputs of the X-axis, Y-axis, and Z-axis accelerometers 1024*x, y, z* using known methods. Single- and multi-axis models of the accelerometer 1024 are capable of detecting magnitude and direction of acceleration as a vector quantity, and may be used to sense orientation and/or coordinate acceleration of the vehicle 908.

A forward and rearward image capture module 1018, 1022 coupled to the server device 1004 may be equipped with built-in cameras and/or peripheral cameras, such as webcams installed inside and/or outside the vehicle 908. The image capture module(s) 1018, 1022 may be oriented toward the front and/or rear of the vehicle 908. For example, the forward image capture module 1018 may be oriented toward the front of the vehicle 908 to observe the forward area of the vehicle 908 while the rearward image capture module 1022 may be oriented toward the rear of the vehicle 908 to observe the rearward area of the vehicle 908, or vice-versa. Some embodiments of the treatment system 900 may have both the forward image capture module 1018 and the rearward image capture module 1022, but other embodiments may have only one or no image capture module. Further, either or both of the forward image capture module 1018 and the rearward image capture module 1022 may include an infrared illuminator 1018*i*, 1022*i*, respectively, to facilitate low light and/or night image capturing. Such an infrared illuminator 1018*i*, 1022*i* may be automatically activated when light is insufficient for image capturing.

The position module 1006, the image capture modules 1018, 1022, and the accelerometer array 1024 may be referred to collectively as the "sensors" of server device 1004. Of course, it will be appreciated that additional position modules 1006, image capture modules 1018, 1022, and/or the accelerometer arrays 1024 may be operatively coupled to the server device 1004. Further, the server device 1004 may also include or be coupled to other sensors such as a thermometer, microphone, thermal image capture device, biomedical sensor, etc. The microphone may be incorporated with the user interface module 1002 and used to receive voice inputs from the vehicle operator while the thermometer and/or thermal image capture device may be used to determine fire or heat damage to the vehicle 908, and the biomedical sensor may capture biological characteristics of the vehicle operator.

Another of the plurality of client applications 1030 or routines 1034 may include an accelerometer routine 1038 that determines the acceleration and direction of movements of the server device 104, which correlate to the acceleration and direction of the vehicle 908. The accelerometer routine may process data from the accelerometer array 1024 to determine one or more vectors describing the motion of the vehicle 908 for use with the client application 1032. In some embodiments where the accelerometer array 1024 has X-axis, Y-axis, and Z-axis accelerometers 1024*x,y,z*, the accelerometer routine 1038 may combine the data from each accelerometer 1024*x,y,z* to establish the vectors describing the motion of the vehicle 908 as it moves through three dimensional space. In some embodiments, the accelerometer routine 1038 may use data pertaining to less than three axes.

Another routine in the plurality of applications 1030 or routines 1034 may include a vehicle velocity routine 1040 that coordinates with the GPS module 1006 to retrieve vehicle velocity and direction information for use with one or more of the plurality of applications, such as the client application 1032, or for use with other routines.

Yet another routine in the plurality of applications 1030 or routines 1034 may include an image capture routine that coordinates with the image capture modules 1018, 1022 to retrieve image data for use with one or more of the plurality of applications, such as the client application 1032, or for use with other routines.

The user or vehicle operator may also launch or instantiate any other suitable user interface application (e.g., the native web browser 1036, or any other one of the plurality of software applications 1030) to access the server device 1004 to implement the vehicle treatment system.

It is to be appreciated that although FIG. 10 illustrates one embodiment of a particular system component, other types and amounts of such components may be configured in the system for treating a damaged vehicle. For example, while only one processor is shown, the server device 1004 may include multiple processors and/or microprocessors. The memory of the server device 1004 may also include multiple RAMs and multiple program memories, which may be implemented as semiconductor memories, magnetically readable memories, and/or optically readable memories, for example. The user interface module 1002 may include a "soft" keyboard that is presented on a display screen of the server device 1004, an external hardware keyboard communicating via a wired or a wireless connection (e.g., a Bluetooth keyboard), and an external mouse, or any other suitable user-input device or component (see examples in FIGS. 11-14). As described earlier, the user-input module 1002 may also include a microphone (not shown) capable of receiving voice input from a vehicle operator as well as a display screen. The communication unit 1020 may also be capable of communicating using a near field communication standard (e.g., ISO/IEC 18092, standards provided by the NFC Forum, etc.).

FIGS. 11-14 depict application pages that may be presented on the user interface 1002 of the mobile computing device 910 as part of the user interface used to implement the vehicle treatment system 900. While FIGS. 11-14 depict pages or screens of information capable of being presented on the display 1002 of the mobile computing device 910, it is to be understood that the application pages or screens of information could be displayed on the display 1002 of the on-board computing device 914 in addition to being displayed on the mobile device 910 or as an alternative. In addition, the application pages may also be displayed on the user interface 963 of the server device 940. The applications or pages may be generated by the mobile computing device 910/914 or sent to the mobile computing device 910/914 by the server 940 (e.g., as with a thin client). The user may launch the application from the mobile computing device 910/914 via any suitable manner, such as touch-selecting a start application icon 1104 on the display 1002 of the mobile computing device 910/914 or speaking a voice command into the microphone (not shown) of the mobile computing device 910/914. After the user launches the application 1032, the application 1032 may begin to run on the mobile computing device 910/914 as described above in connection to block 202, FIG. 2; or the mobile computing device 910 may communicate with the on-board computing device 914 and the client application 1032 may begin to run on the on-board computing device 914.

With reference now to FIG. 11, a monitor screen 1100 of the client application and/or routine may be displayed on the screen of the mobile computing device 910/914. The monitor screen 1100 may include a 'Calibrate" tab 1102, a "Start" tab 1104, a "Settings" tab 1106, and a 'Report' tab 1108. When the user selects the "Calibrate" tab 1102, the client application may execute a calibration routine. A calibration screen (not shown) may be displayed on the screen of the mobile computing device 910/914 during execution of the calibration routine, wherein the progress of the calibration routine may be indicated by an illustration showing the approximate status of the calibration routine. If desired, a user may cancel the calibration and/or set the calibration routine to run in the "background," so as not to appear on the screen 1100 of the mobile computing device 910/914.

When the user selects the "Start" tab 1104, the client application may begin to monitor and collect data about vehicle operation. The collected data may be stored as described above and/or additional data may be mathematically determined from the collected data about vehicle operation and also stored. Once started, a vehicle monitor screen 1200 shown in FIG. 12 may be displayed on the screen of the mobile computing device 910/914. The vehicle monitor screen 1200 may include a "Stop" tab 1202. If the "Stop" tab 1202 is selected by the user, the vehicle treatment system 900 will terminate vehicle operation monitoring. The vehicle treatment system 900 may also be stopped by a voice command of the user. Alternatively, the vehicle treatment system 900, e.g., gathering and analyzing of the vehicle operation and/or collision data, may be ceased by the mobile computing device 910/914 detecting that the engine of the vehicle 908 has stopped.

Referring now to FIG. 13, when the user selects the "Settings" tab 1106 shown in FIG. 11, a settings screen 1300 may be displayed on the screen of the mobile computing device 910/914. The settings screen 1300 may include a variety of information that the user or vehicle operator may enter into the vehicle treatment system 900 via a "soft" keyboard 1306 of the user interface of the mobile computing device 910/914. Such information may include the vehicle owner's name and/or contact information 1302. Additional information may include the make, model, and year of the vehicle type 1304 of the vehicle 908 that will be utilized with the treatment system 900. The settings screen 1300 may also include a variety of parameters that may be entered and adjusted by the user, such as the mode for turning on the treatment system 900, i.e., manual or automatic, etc. The parameters may be modified and saved by the user or vehicle operator via selection of a "Save" tab 1308 of the user interface on the mobile computing device 910/914.

Referring now to FIG. 14, when the user selects the "Report" tab 1108 shown in FIG. 11, a report screen 1400 may be displayed on the screen of the mobile device 910/914. The report screen 1400 may include a list of contacts 1402 to be notified in the event of a crash. The contact list 1402 may include the vehicle owner, insurance agent, etc., and may be entered and/or modified by the user via a "soft" keyboard 1406 of a user interface of the mobile computing device 910. The list of contacts 1402 may be saved by the user or vehicle operator via selection of the "Save" tab 1408 of the user interface of the mobile computing device 910.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Although the preceding text sets forth a detailed description of numerous different embodiments, it should be understood that the legal scope of the invention is defined by the words of the claims set forth at the end of this patent. The detailed description is to be construed as example only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

Aspect 1: A method implemented with a computer system for treating a vehicle damaged in a crash, the method comprising receiving crash information about a damaged vehicle; receiving at least one segment of a plurality of segments of a specialty vehicle data identifier used to identify the damaged vehicle, wherein the at least one segment of the specialty vehicle data identifier is representative of a vehicle attribute of the damaged vehicle; requesting from a memory, by one or more processors of the computer system, vehicle collision data stored thereon, the vehicle collision data associated with the received at least one segment of the plurality of segments of the specialty vehicle data identifier; receiving, by the one or more processors, the vehicle collision data from the memory in response to the request; analyzing the received crash information; determining, by the one or more processors, a treatment complexity level associated with treating the damaged vehicle based on the analysis of the received crash information, wherein treating the damaged vehicle includes repairing, salvaging, and/or scrapping the damaged vehicle; selecting, by the one or more processors, a treatment facility for treating the damaged vehicle based on the determined treatment complexity level; and transmitting information associated with treating the damaged vehicle to the selected treatment facility.

Aspect 2: The method of aspect 1, wherein receiving the vehicle collision data includes receiving vehicle collision data of a vehicle type that matches the vehicle type represented within the received at least one segment of the specialty vehicle data identifier of the damaged vehicle.

Aspect 3: The method of any one of aspects 1 and 2, wherein analyzing the received crash information includes evaluating, by the one or more processors, the received crash information and the received vehicle collision data.

Aspect 4: The method of any one of aspects 1-3, wherein evaluating the received crash information and the received vehicle collision data includes comparing the received crash information to the received vehicle collision data.

Aspect 5: The method of any one of aspects 1-4, wherein receiving crash information about the damaged vehicle includes receiving a description of the damaged vehicle.

Aspect 6: The method of any one of aspects 1-4, wherein receiving crash information about the damaged vehicle includes receiving a verbal description of the damaged vehicle.

Aspect 7: The method of any one of aspects 1-4, wherein receiving crash information about the damaged vehicle includes receiving a visual description of the damaged vehicle.

Aspect 8: The method of any one of aspects 1-4 wherein receiving crash information about the damaged vehicle includes receiving, by the one or more processors, an electronic-based description of the damaged vehicle.

Aspect 9: The method of any one of aspects 1-8, wherein receiving crash information about the damaged vehicle includes receiving, by the one or more processors, operating information of the damaged vehicle attained by one or more sensors coupled to the damaged vehicle.

Aspect 10: The method of any one of aspects 1-9, wherein transmitting information includes a request for proposal to treat the damaged vehicle, and wherein the request includes a list of at least one undamaged replacement vehicle part that corresponds to at least one damaged vehicle part of the damaged vehicle, and further wherein the at least one undamaged replacement vehicle part is available from a storage of undamaged vehicle parts salvaged from other vehicle collisions.

Aspect 11: The method of any one of aspects 1-10, wherein the vehicle attribute includes one or more of the following: vehicle owner, vehicle insurer, vehicle manufacturer, vehicle type, vehicle make, vehicle model, and/or vehicle trim level, vehicle body style, vehicle safety equipment, vehicle engine type, vehicle manufacture date, vehicle manufacture location, vehicle recall information, vehicle defect investigations, vehicle complaints, vehicle service bulletins, and/or vehicle alerts.

Aspect 12: A system for treating a vehicle damaged in a crash, the system comprising: one or more processors configured to receive crash information of the damaged vehicle, the crash information including at least one segment of a specialty vehicle data identifier used to identify the damaged vehicle, wherein the at least one segment of the specialty vehicle data identifier is representative of a vehicle attribute of the damaged vehicle; a user interface module coupled to the one or more processors and facilitating interaction between the system and a user; one or more memory devices coupled to the one or more processors and including vehicle collision data stored thereon, the vehicle collision data associated with at least one segment of a plurality of segments of a specialty vehicle data identifier template used to facilitate translation of the specialty vehicle data identifier; executable instructions stored on the one or more memory devices, which when executed by the one or more processors cause the computer system to analyze the received crash information and determine an output including a treatment complexity level for treating the damaged vehicle, wherein treating the damaged vehicle includes repairing, salvaging, and/or scrapping the damaged vehicle; an output module operatively coupled to the one or more processors and providing the output in an accessible format; and a communication module coupled to the one or more processors and configured to transmit information associated with the output.

Aspect 13: The system of aspect 12, wherein the treatment complexity level includes a price schedule for treating the damaged vehicle, a time duration for completing treatment of the damaged vehicle, and a damaged vehicle parts list including vehicle parts of the damaged vehicle estimated to be damaged by the crash.

Aspect 14: The system of aspects 12 or 13, further comprising: an interface module coupled to the one or more processors and configured to receive a request for the treatment complexity level of the damaged vehicle; a search module operatively coupled to the one or more processors and configured to identify the vehicle collision data stored in the one or more memory devices and correlated with the at least one segment of the plurality of segments of the specialty vehicle data identifier template that substantially matches the received at least one segment of the specialty vehicle data identifier of the damaged vehicle; and a compiler module operatively coupled to the one or more processors and configured to accumulate any identified vehicle collision data into the output.

Aspect 15: The system of any one of aspects 12-14, wherein the vehicle attribute includes one or more of the following: vehicle owner, vehicle insurer, vehicle manufacturer, vehicle type, vehicle make, model, and/or trim level, construction materials, vehicle body style, vehicle safety equipment, vehicle engine type, vehicle manufacture date, vehicle manufacture location, vehicle recall information, vehicle defect investigations, vehicle complaints, vehicle service bulletins, and/or vehicle alerts.

Aspect 16: The system of any one of aspects 12-16, further comprising: a correlation module coupled to the one or more processors and configured to correlate the received crash information with the at least one segment of the plurality of segments of the specialty vehicle data identifier template.

Aspect 17: A system for treating a vehicle damaged in a crash, the system comprising: one or more processors coupled to one or more memory devices and one or more user interfaces, the one or more processors configured to receive crash information of the damaged vehicle, the crash information including a specialty vehicle data identifier used to identify the damaged vehicle, wherein the specialty vehicle data identifier includes a plurality of segments and at least one segment of the plurality of segments is representative of a vehicle attribute of the damaged vehicle, and wherein the system is configured to automatically: receive crash information about the damaged vehicle; receive at least one segment of a plurality of segments of a specialty vehicle data identifier; request vehicle collision data from a memory, the requested vehicle collision data associated with one or more segments of a specialty vehicle data identifier template used to facilitate translation of the specialty vehicle data identifier; receive the requested vehicle collision data from the memory in response to the request; analyze the received crash information; determine a treatment complexity level associated with treating the damaged vehicle based on the analysis of the received crash information, wherein treating the damaged vehicle includes repairing, salvaging, and/or scrapping the damaged vehicle; select a treatment facility for treating the damaged vehicle based on the determined treatment complexity level; and transmit information associated with treating the damaged vehicle to the selected treatment facility.

Aspect 18: The system of aspect 17, wherein the vehicle attribute includes one or more of the following: vehicle owner, vehicle insurer, vehicle manufacturer, vehicle type, vehicle make, model, and/or trim level, construction materials, vehicle body style, vehicle safety equipment, vehicle engine type, vehicle manufacture date, vehicle manufacture location, vehicle recall information, vehicle defect investigations, vehicle complaints, vehicle service bulletins, and/or vehicle alerts.

Aspect 19: A tangible non-transitory computer-readable medium having instructions stored thereon for facilitating treatment of a vehicle damaged in a crash, the instructions, when executed by one or more processors of a computer system, cause the one or more processors to: receive crash information about the damaged vehicle; receive at least one segment of a plurality of segments of a specialty vehicle data identifier; request vehicle collision data from a memory, the requested vehicle collision data associated with one or more segments of a specialty vehicle data identifier template used to facilitate translation of the specialty vehicle data identifier; receive the requested vehicle collision data from the memory in response to the request; analyze the received crash information; determine a treatment complexity level associated with treating the damaged vehicle based on the analysis of the received crash information, wherein treating the damaged vehicle includes repairing, salvaging, and/or scrapping the damaged vehicle; select a treatment facility for treating the damaged vehicle based on the determined treatment complexity level; and transmit information associated with treating the damaged vehicle to the selected treatment facility.

Aspect 20: The tangible non-transitory computer-readable medium of aspect 19, wherein the vehicle attribute includes one or more of the following: vehicle owner, vehicle insurer, vehicle manufacturer, vehicle type, vehicle make, model, and/or trim level, construction materials, vehicle body style, vehicle safety equipment, vehicle engine type, vehicle manufacture date, vehicle manufacture location, vehicle recall information, vehicle defect investigations, vehicle complaints, vehicle service bulletins, and/or vehicle alerts.

What is claimed:

1. A method implemented with a computer system for treating a vehicle damaged in a crash, the method comprising:
providing a specialty vehicle data identifier template for facilitating translation of a specialty vehicle data identifier used to identify a vehicle, the specialty vehicle data identifier template stored on one or more memory devices coupled to the computer system and including a plurality of segments, each segment of the plurality of segments capable of including a code representative of a vehicle insurance data associated with a vehicle type that includes the damaged vehicle;
providing a database configured in the one or more memory devices, the database including the vehicle insurance data;
monitoring, by one or more sensors coupled to the vehicle, operating characteristics of a vehicle damaged in a crash, the operating characteristics including acceleration and direction of the damaged vehicle;
receiving, from the one or more sensors, acceleration and direction of the damaged vehicle proximate the crash;
calculating, via one or more processors coupled to the one or more sensors, crash information of the damaged vehicle based on the received acceleration and direction of the damaged vehicle proximate the crash;
incorporating, by the one or more processors, the calculated crash information with the vehicle insurance data stored in the database;
receiving, by the one or more processors coupled to the one or more memory devices, a request for vehicle collision data stored in the database, the request including at least one segment of the plurality of segments of the specialty vehicle data identifier used to identify the damaged vehicle and the code representative of the vehicle insurance data;
retrieving, by the one or more processors, the vehicle collision data from the memory in response to the received request;
automatically evaluating, by the one or more processors, the calculated crash information with the retrieved vehicle collision data and the vehicle insurance data;
automatically calculating, by the one or more processors, a treatment complexity level associated with repairing and/or salvaging the damaged vehicle based on the evaluation of the calculated crash information, the treatment complexity level including a price schedule and/or a time duration for repairing and/or salvaging the damaged vehicle;
automatically selecting, by the one or more processors, a treatment facility for treating the damaged vehicle based on the calculated treatment complexity level, wherein the damaged vehicle is transported directly to the selected treatment facility from the crash site; and
transmitting information associated with repairing and/or salvaging the damaged vehicle to the selected treatment facility.

2. The method of claim 1, wherein the vehicle insurance data includes one or more of the following: vehicle actuarial data of the vehicle type that includes the damaged vehicle, vehicle insurance-rating data of the vehicle type that includes the damaged vehicle, vehicle insurance-underwriting data of the vehicle type that includes the damaged vehicle, and vehicle insurance claims data of the vehicle type that includes the damaged vehicle.

3. The method of claim 1, wherein evaluating the received crash information with the received vehicle collision data includes comparing the calculated crash information to the received vehicle insurance data.

4. The method of claim 1, wherein receiving crash information about the damaged vehicle includes receiving a damage description of the damaged vehicle.

5. The method of claim 1, wherein transmitting information includes a request for proposal to treat the damaged vehicle, and wherein the request includes a list of at least one undamaged replacement vehicle part that corresponds to at least one damaged vehicle part of the damaged vehicle, and further wherein the at least one undamaged replacement vehicle part is available from a storage of undamaged vehicle parts salvaged from other vehicle collisions.

6. A system for treating a vehicle damaged in a crash, the system comprising:
- a specialty vehicle data identifier template for facilitating translation of a specialty vehicle data identifier associated with a vehicle, the specialty vehicle data identifier template stored on one or more memory devices of a computing system and including a plurality of segments, each segment of the plurality of segments capable of including a code representative of a vehicle insurance data associated with a vehicle type that includes the damaged vehicle;
- a database configured in the one or more memory devices and including the vehicle insurance data;
- one or more sensors coupled to the vehicle and capable of monitoring operating characteristics of the vehicle, the operating characteristics including acceleration and direction of the vehicle;
- one or more processors coupled to the one or more memory devices and configured to calculate crash information of the vehicle based on the acceleration and the direction of the vehicle proximate the crash, incorporate the calculated crash information with the vehicle insurance data stored in the database, and receive the specialty vehicle data identifier including the code representative of the vehicle insurance data;
- vehicle collision data stored in the database, the vehicle collision data associated with at least one segment of the specialty vehicle data identifier including the code representative of the vehicle insurance data;
- executable instructions stored on the one or more memory devices, which when executed by the one or more processors cause the system to evaluate the calculated crash information with the vehicle collision data and the vehicle insurance data to calculate an output including a treatment complexity level for repairing and/or salvaging the damaged vehicle, the treatment complexity level including a price schedule and/or a time duration for repairing and/or salvaging the damaged vehicle, and select a treatment facility for treating the damaged vehicle based on the calculated treatment complexity level, wherein the damaged vehicle is transported directly to the selected treatment facility from the crash site;
- an output module operatively coupled to the one or more processors and providing the calculated treatment complexity level in an accessible format; and
- a communication module coupled to the one or more processors and configured to transmit the calculated treatment complexity level to another computer device.

7. The system of claim 6, wherein the vehicle insurance data includes one or more of the following: vehicle actuarial data of the vehicle type that includes the damaged vehicle, vehicle insurance-rating data of the vehicle type that includes the damaged vehicle, vehicle insurance-underwriting data of the vehicle type that includes the damaged vehicle, and vehicle insurance claims data of the vehicle type that includes the damaged vehicle.

8. The system of claim 6, wherein the treatment complexity level further includes a damaged vehicle parts list including vehicle parts of the damaged vehicle estimated to be damaged by the crash.

9. The system of claim 6, further comprising:
- a user interface module coupled to the one or more processors and facilitating user interaction with the system;
- an interface module coupled to the user interface and the one or more processors and configured to receive a request for the treatment complexity level of the damaged vehicle based on the at least one segment of the specialty vehicle data identifier of the damaged vehicle; and
- a search module operatively coupled to the user interface and the one or more processors and configured to identify the vehicle insurance data stored in the one or more memory devices that substantially matches the at least one segment of the specialty vehicle data identifier of the damaged vehicle; and
- a compiler module operatively coupled to the one or more processors and configured to accumulate any of the identified vehicle insurance data into the output.

10. The system of claim 6, further comprising:
- a correlation module coupled to the one or more processors and configured to correlate the received crash information with the at least one segment of the plurality of segments of the specialty vehicle data identifier template.

11. The method of claim 6, wherein the output includes a request for proposal to treat the damaged vehicle, and wherein the request includes a list of at least one undamaged replacement vehicle part that corresponds to at least one damaged vehicle part of the damaged vehicle, and further wherein the at least one undamaged replacement vehicle part is available from a storage of undamaged vehicle parts salvaged from other vehicle collisions.

12. A system for treating a vehicle damaged in a crash, the system comprising:
- a specialty vehicle data identifier template for facilitating translation of a specialty vehicle data identifier associated with a vehicle, the specialty vehicle data identifier template stored on a database configured in one or more memory devices of a computer system and including a plurality of segments, each segment of the plurality of segments capable of including a code representative of a vehicle insurance data associated with a vehicle type that includes the damaged vehicle;
- one or more sensors coupled to the vehicle and capable of monitoring operating characteristics of the vehicle, the operating characteristics including acceleration and direction of the damaged vehicle;
- one or more processors coupled to one or more memory devices one or more user interfaces, and the one or more sensors, the one or more processors configured to receive the specialty vehicle data identifier, and wherein the system is configured to automatically:
- receive, from the one or more sensors, the acceleration and the direction of the damaged vehicle proximate the crash;
- calculate crash information of the damaged vehicle based on the received acceleration and direction of the damaged vehicle proximate the crash;
- incorporate the calculated crash information with the vehicle insurance data stored in the database;
- receive a request for vehicle collision data stored in the database on the one or more memory devices, the request including at least one segment of the plurality of segments of the specialty vehicle data identifier used to identify the damaged vehicle and the code representative of the vehicle insurance data;

retrieve the requested vehicle collision data from the one or more memory devices in response to the received request;

evaluate the calculated crash information with the retrieved vehicle collision data and the vehicle insurance data;

calculate a treatment complexity level associated with repairing and/or salvaging the damaged vehicle based on the evaluation of the calculated crash information, the treatment complexity level including a price schedule and/or a time duration for repairing and/or salvaging the damaged vehicle;

select a treatment facility for repairing and/or salvaging the damaged vehicle based on the calculated treatment complexity level, wherein the damaged vehicle is transported directly to the selected treatment facility from the crash site; and transmit information associated with repairing and/or salvaging the damaged vehicle to the selected treatment facility.

13. The system of claim 12, wherein the vehicle insurance data includes one or more of the following: vehicle actuarial data of the vehicle type that includes the damaged vehicle, vehicle insurance-rating data of the vehicle type that includes the damaged vehicle, vehicle insurance-underwriting data of the vehicle type that includes the damaged vehicle, and vehicle insurance claims data of the vehicle type that includes the damaged vehicle.

* * * * *